United States Patent
Troy et al.

(10) Patent No.: US 11,485,018 B2
(45) Date of Patent: Nov. 1, 2022

(54) ROBOTIC END EFFECTOR SYSTEM WITH SURFACE TRACKING AND METHODS FOR USE

(71) Applicant: The Boeing Company, Chicago, IL (US)

(72) Inventors: James J. Troy, Issaquah, WA (US); Daniel James Wright, Mercer Island, WA (US); Scott Wesley Lea, Renton, WA (US); William Joseph Tapia, Kapowsin, WA (US); Gary Ernest Georgeson, Tacoma, WA (US)

(73) Assignee: The Boeing Company, Chicago, IL (US)

( * ) Notice: Subject to any disclaimer, the term of this patent is extended or adjusted under 35 U.S.C. 154(b) by 417 days.

(21) Appl. No.: 16/572,390

(22) Filed: Sep. 16, 2019

(65) Prior Publication Data

US 2021/0078177 A1 Mar. 18, 2021

(51) Int. Cl.
*B25J 19/02* (2006.01)
*B25J 9/16* (2006.01)
*B25J 15/00* (2006.01)
*B25J 18/02* (2006.01)
*B25J 17/02* (2006.01)

(52) U.S. Cl.
CPC ......... *B25J 9/1684* (2013.01); *B25J 15/0019* (2013.01); *B25J 17/0241* (2013.01); *B25J 18/02* (2013.01); *B25J 19/02* (2013.01); *B25J 19/021* (2013.01); *B25J 19/026* (2013.01)

(58) Field of Classification Search
CPC ........ B25J 9/1684; B25J 19/021; B25J 18/02; B25J 15/0019; B25J 19/02; B25J 17/0241; B25J 19/026; G01N 29/265; G01N 29/225; G01N 2291/0231; G01N 2291/2694; B64F 5/60; B64C 2001/0072; B64C 1/12

See application file for complete search history.

(56) References Cited

U.S. PATENT DOCUMENTS

| | | | |
|---|---|---|---|
| 10,625,427 B2 * | 4/2020 | Troy | B25J 9/1692 |
| 10,634,632 B2 | 4/2020 | Troy et al. | |
| 10,677,715 B2 | 6/2020 | Tat et al. | |
| 10,788,462 B2 | 9/2020 | Troy et al. | |
| 10,814,480 B2 | 10/2020 | Georgeson et al. | |
| 2019/0154472 A1 * | 5/2019 | Crothers | G01N 25/72 |

(Continued)

FOREIGN PATENT DOCUMENTS

EP 3 683 576 A1 * 7/2020 ............. G01N 29/04

OTHER PUBLICATIONS

Chatzakos et al., Autonomous Infrared (IR) Thermography based inspection of glass reinforced plastic (GRP) wind turbine blades (WTBs), 2010, IEEE, pg. (Year: 2010).*

(Continued)

*Primary Examiner* — Mcdieunel Marc
(74) *Attorney, Agent, or Firm* — Yee & Associates, P.C.

(57) ABSTRACT

A non-destructive inspection system is presented. The non-destructive inspection system comprises a robotic end effector having an extendable actuator and a flange-mounted roller containing an ultrasonic sensor, the flange-mounted roller connected to the extendable actuator by a pivot connection, the extendable actuator configured to extend the flange-mounted roller until the flange-mounted roller contacts an inspection surface.

21 Claims, 18 Drawing Sheets

(56) References Cited

U.S. PATENT DOCUMENTS

2019/0173574 A1\* 6/2019 Georgeson ........... G01N 29/265
2019/0258251 A1\* 8/2019 Ditty .................. G06K 9/00805
2020/0232951 A1 7/2020 Fetzer et al.

OTHER PUBLICATIONS

White et al., The design and operational performance of a climbing robot used for weld inspection in hazardous environments, 1998, IEEE, pg. (Year: 1998).\*

Mutka et al., Control system for reactor vessel inspection manipulator, 2009, IEEE, pg. (Year: 2009).\*

Fukuda et al., Autonomous Pipeline Inspection and Maintenance Robot With Inch Worm Mobile Mechanis, 1987, IEEE, p. 359-544 (Year: 1987).\*

\* cited by examiner

ROBOTIC END EFFECTOR SYSTEM WITH SURFACE TRACKING AND METHODS FOR USE

GOVERNMENT CONTRACT

The invention described herein was made in the performance of work under NASA Contract No. NNL09AA00A and is subject to the provisions of Section 305 of the National Aeronautics and Space Act of 1958 (72 Stat.435: 42 U.S.C. 2457.)

BACKGROUND INFORMATION

1. Field

The present disclosure relates generally to robotic end effectors. More specifically, the present disclosure relates to an apparatus and method for movement of robotic end effectors relative to an inspection surface. Also, the present disclosure relates to an apparatus and method for performing non-destructive inspections.

2. Background

Moving robotic end effectors within a manufacturing environment may be more difficult or time-consuming than desired. Additionally, prior knowledge, such as a three-dimensional model or surface scan of a structure, may be used to create a motion plan to move a robotic end effector relative to a surface of the structure. Some movement systems for robotic end effectors, including non-destructive inspection systems, may be more complicated than desired to program.

Therefore, it would be desirable to have a method and apparatus that takes into account at least some of the issues discussed above, as well as other possible issues.

SUMMARY

An illustrative embodiment of the present disclosure provides a non-destructive inspection system. The non-destructive inspection system comprises a robotic end effector having an extendable actuator and a flange-mounted roller containing an ultrasonic sensor. The flange-mounted roller is connected to the extendable actuator by a pivot connection. The extendable actuator is configured to extend the flange-mounted roller until the flange-mounted roller contacts an inspection surface.

Another illustrative embodiment of the present disclosure provides a method of performing an ultrasonic inspection. An extendable actuator of a robotic end effector is extended to place a flange-mounted roller containing an ultrasonic sensor into contact with an inspection surface of a structure, wherein the flange-mounted roller is connected to the extendable actuator by a pivot connection. The robotic end effector relative is moved to the inspection surface in order to roll the flange-mounted roller across the inspection surface. Ultrasonic inspection data of the inspection surface is generated as the flange-mounted roller rolls across the inspection surface.

Yet another illustrative embodiment of the present disclosure provides a method of following a surface of a structure with a robotic end effector. Distance measurements are taken to the surface using distance sensors of the robotic end effector. An angular measurement of the robotic end effector is taken using a rotational angle sensor. A desired vertical position and a desired horizontal position are determined for the robotic end effector using the distance measurements, the angular measurement, a desired offset distance, an initial pitch angle, an initial horizontal position, and an initial vertical position. The robotic end effector is driven to the desired vertical position and the desired horizontal position.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
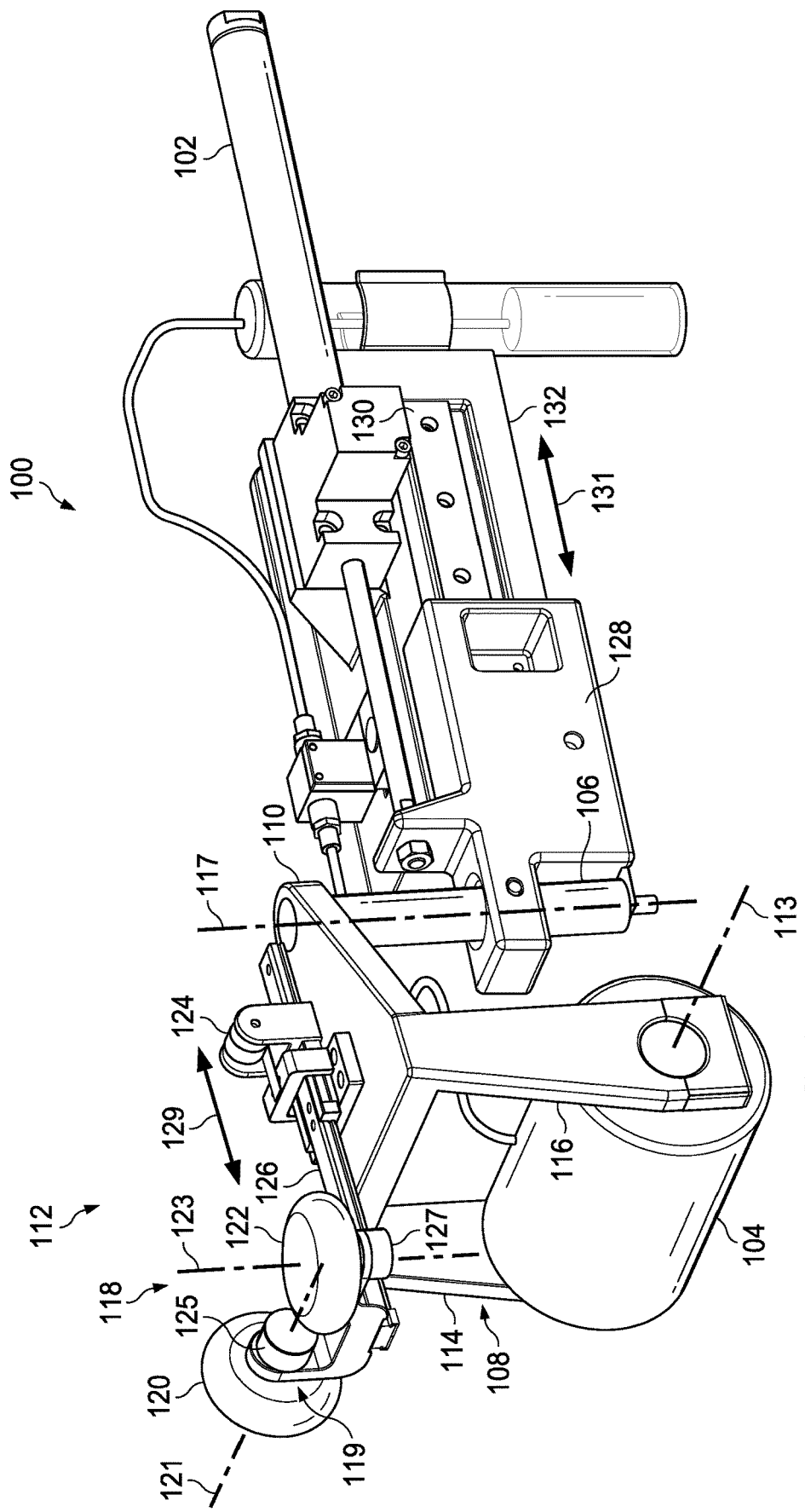
FIG. 1 is an illustration of an ultrasonic inspection system, of a non-destructive inspection system, with an extendable actuator and a flange-mounted roller in accordance with an illustrative embodiment.

The illustrative embodiments recognize and take into account one or more different considerations. For example, the illustrative embodiments recognize and take into account that aircraft are being designed and manufactured with greater and greater percentages of composite materials. The illustrative embodiments recognize and take into account that composite materials are used in aircraft to decrease the weight of the aircraft. This decreased weight improves performance features such as payload capacities and fuel efficiencies. Further, composite materials may provide longer service life than some other materials for various components in an aircraft.

The illustrative embodiments recognize and take into account that composite materials are tough, lightweight materials created by combining two or more functional components. For example, the illustrative embodiments recognize and take into account that a composite material may include reinforcing fibers bound in polymer resin matrix. The fibers may be unidirectional or may take the form of a woven cloth or fabric. The fibers and resins are arranged and cured or consolidated to form a composite material.

The illustrative embodiments recognize and take into account that in manufacturing composite structures, layers of composite material are typically laid up on a tool. The layers may be comprised of fibers in sheets. These sheets may take the form of fabrics, tape, tows, or other suitable forms. In some cases, resin may be infused or pre-impregnated into the sheets. These types of sheets are commonly referred to as prepreg.

The illustrative embodiments recognize and take into account that the different layers of prepreg may be laid up in different orientations and different numbers of layers may be used depending on the thickness of the composite structure being manufactured. These layers may be laid up by hand or using automated lamination equipment such as a tape laminating machine or a fiber placement system.

The illustrative embodiments recognize and take into account that if an inconsistency is present in the material, the composite structure may be reworked in some situations. The illustrative embodiments recognize and take into account that examples of inconsistencies that may be present in a composite structure include voids, porosity, delamination, foreign object debris (FOD), in-plane and out of plane wrinkles, and other types of inconsistencies. The illustrative embodiments recognize and take into account that characterizing an inconsistency relative to its features such as size, geometry or depth or classifying a type of inconsistency is used in making a rework determination.

The illustrative embodiments recognize and take into account that it is desirable to inspect large composite structures quickly. The illustrative embodiments also recognize and take into account that it is desirable to accurately characterize at least one of the types of inconsistencies or the sizes of inconsistencies. The illustrative embodiments recognize and take into account that infrared inspection techniques are fast and can cover large areas extremely quickly. The illustrative embodiments recognize and take into account that the characterization capability of infrared inspection techniques for some types of inconsistencies is not as effective as ultrasound inspection.

The illustrative embodiments recognize and take into account that ultrasound inspection can provide more in-depth characterization of composites and metals than infrared inspection. The illustrative embodiments recognize and take into account that ultrasonic inspection is tied to strength allowables in composites for structural assessment and performance prediction. The illustrative embodiments recognize and take into account that the speed of ultrasonic inspections cannot match the full-field infrared inspection method when imaging large areas at a time.

The illustrative embodiments recognize and take into account that multiple types of non-destructive inspection techniques may be applied to a single workpiece. The illustrative embodiments recognize and take into account that moving multiple non-destructive inspection systems around a workpiece may take an undesirable amount of time. The illustrative embodiments recognize and take into account that it would be desirable to provide multiple types of non-destructive inspection techniques in a reduced amount of time.

The illustrative examples recognize and take into account that switching back and forth between different types of NDI modes may take an undesirable amount of time. The illustrative examples recognize and take into account that it would also be desirable to have a system in which changing between ultrasonic and thermographic inspection modes would be relatively quick and easy to perform.

Turning now to FIG. 1, an illustration of an ultrasonic inspection system, of a non-destructive inspection system, with an extendable actuator and a flange-mounted roller is depicted in accordance with an illustrative embodiment. Ultrasonic inspection system 100 is a physical implementation of ultrasonic inspection system 1238 of FIG. 12. In some illustrative examples, ultrasonic inspection system 100 is a physical implementation of robotic end effector 1206 or a portion of robotic end effector 1206 of FIG. 12.

Ultrasonic inspection system 100 comprises extendable actuator 102 and flange-mounted roller 104 containing an ultrasonic sensor (not depicted). Flange-mounted roller 104 is connected to extendable actuator 102 by pivot connection 106. Extendable actuator 102 is configured to extend flange-mounted roller 104 until flange-mounted roller 104 contacts an inspection surface (not depicted). Ultrasonic inspection system 100 is configured to perform ultrasonic inspection on the inspection surface as the flange-mounted roller 104 rolls across the surface.

Flange-mounted roller 104 is mounted to flanges 108 of base 110 of surface contact assembly 112. Flange-mounted roller 104 rotates about axis of rotation 113. Flanges 108 include flange 114 and flange 116. Surface contact assembly 112 is connected to extendable actuator 102 by pivot connection 106. As used herein, "connected to," is indirectly or directly connected to. Surface contact assembly 112 is connected to extendable actuator 102 by sliding structure 128 and pivot connection 106. Pivot connection 106 enables rotation of surface contact assembly 112 about vertical axis 117. Rotation about vertical axis 117 allows flange-mounted roller 104 to follow a curvature of the inspection surface.

Ultrasonic inspection system 100 has number of rotational encoders 119 mounted on omni-directional wheels 118 configured to contact an inspection surface and track movement displacement of the ultrasonic inspection system 100 relative to the inspection surface. Omni-directional wheels 118 includes omni-directional wheel 120 and omni-directional wheel 122. Omni-directional wheel 120 is configured to rotate about horizontal axis 121. Omni-directional wheel 122 is configured to rotate about vertical axis 123.

Number of rotational encoders 119 includes rotational encoder 125 and rotational encoder 127. Rotational encoder 125 is associated with omni-directional wheel 120. Rotational encoder 127 is associated with omni-directional wheel 122.

Horizontal axis 121 is an axis referenced to surface contact assembly 112. Horizontal axis 121 may move relative to a horizontal axis of a manufacturing environment as ultrasonic inspection system 100 moves within the manufacturing environment. Vertical axis 123 is also an axis referenced to surface contact assembly 112. Vertical axis 123 may move relative to a vertical axis of a manufacturing environment as ultrasonic inspection system 100 moves within the manufacturing environment.

Horizontal axis 121 is parallel to axis of rotation 113. Vertical axis 123 is perpendicular to axis of rotation 113.

Number of rotational encoders 119 comprises a first rotary encoder, rotational encoder 125, positioned to rotate about horizontal axis 121 to measure the rotation of an omni-directional wheel to measure vertical displacement and a second rotary encoder, rotational encoder 127, positioned to rotate about vertical axis 123 to measure the rotation of another omni-direction wheel to measure horizontal displacement. Number of rotational encoders 119 connected to omni-directional wheels 118 measures displacement to correlate ultrasonic inspection data from flange-mounted roller 104 to positions on the inspection surface. Number of rotational encoders 119 is connected to base 110 by linear guide 126 and constant force spring 124. Constant force spring 124 is configured to provide a desired force against the inspection surface by omni-directional wheels 118 as base 110 moves relative to number of rotational encoders 119. Constant force spring 124 is configured to provide a desired force against the inspection surface by omni-directional wheels 118 as base 110 moves towards the inspection surface. In some illustrative examples, constant force spring 124 is configured to provide a desired force against the inspection surface by omni-directional wheels 118 as base 110 and omni-directional wheels 118 move relative to the inspection surface.

As depicted, omni-directional wheels 118 are mounted to linear guide 126. Linear guide 126 permits movement of omni-directional wheels 118 in direction 129. Constant force spring 124 maintains a desired force of omni-directional wheels 118 against the inspection surface as extendable actuator 102 extends to place flange-mounted roller 104 in contact with the inspection surface.

Sliding structure 128 rides along linear guide 130 and connects extendable actuator 102 to pivot connection 106. Linear guide 130 permits movement of Sliding structure 128 in direction 131. Linear guide 130 and extendable actuator 102 are mounted on base structure 132. Base structure 132 is secured to any desirable movement system. In an example, base structure 132 is secured to housing 208 of FIG. 2. In an example, base structure 132 is part of an end effector.

The illustration of ultrasonic inspection system 100 in FIG. 1 is not meant to imply physical or architectural limitations to the manner in which an illustrative embodiment may be implemented. Other components in addition to or in place of the ones illustrated may be used. Some components may be unnecessary.

In some illustrative examples, extendable actuator 102 is a compliant actuator that provides a constant amount (or nearly constant amount) of force to the sliding structure 128. For example, extendable actuator 102 may take the form of a pneumatic actuator.

Further, although not depicted, a movement system will be connected to ultrasonic inspection system 100 to move ultrasonic inspection system 100 relative to the inspection surface. In some illustrative examples, a robotic end effector comprising ultrasonic inspection system 100 is connected to a movement system configured to move the robotic end effector relative to the inspection surface of the structure.

In some illustrative examples, a force control system is positioned between extendable actuator 102 and flange-mounted roller 104. The force control system is configured to control the amount of force applied by flange-mounted roller 104 to the inspection structure. The force control system takes any desirable form, such as an accumulator, a spring, or any other desirable system configured to apply a desired amount of force by flange-mounted roller 104.

Figure 2:
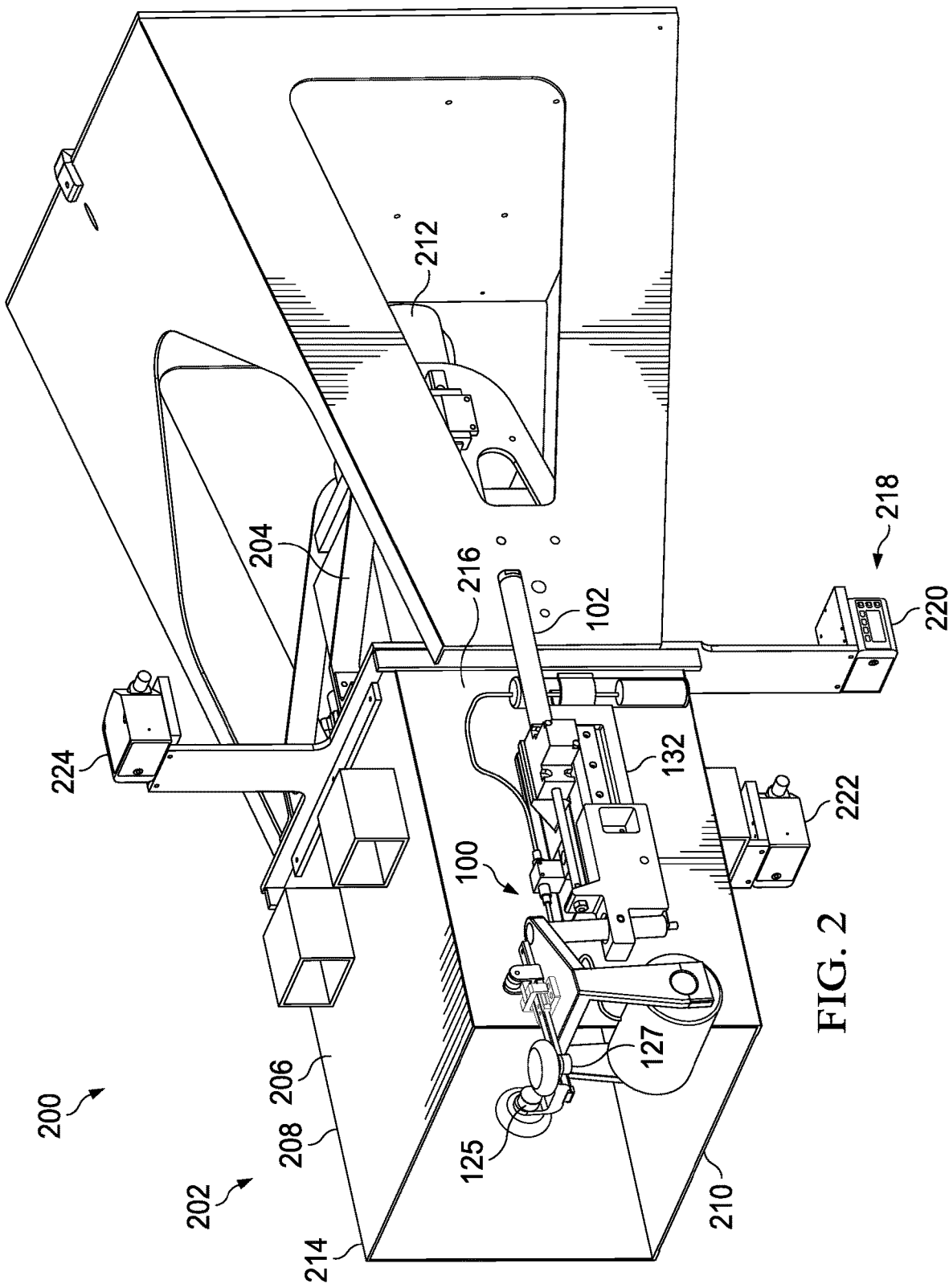
FIG. 2 is an illustration of a side-front orthographic projection view of a robotic end effector with a dual function non-destructive inspection apparatus in accordance with an illustrative embodiment.

Turning now to FIG. 2, a non-destructive inspection system including a robotic end effector with a dual function non-destructive inspection apparatus is shown. In particular, an illustration of a side-front orthographic view of a robotic end effector with a dual function non-destructive inspection apparatus is depicted in accordance with an illustrative embodiment. Robotic end effector 200 is a physical implementation of robotic end effector 1206 of FIG. 12. Dual function non-destructive inspection apparatus 202 is present in robotic end effector 200. Dual function non-destructive inspection apparatus 202 is a physical implementation of dual function non-destructive inspection apparatus 1254 of FIG. 12.

Dual function non-destructive inspection apparatus 202 has thermographic inspection system 204 and ultrasonic inspection system 100. Although dual function non-destructive inspection apparatus 202 in FIG. 2 is depicted as including ultrasonic inspection system 100 of FIG. 1, in some illustrative examples, dual function non-destructive inspection apparatus 202 includes an ultrasonic inspection system having a different design.

As depicted, mounting base structure 132 is mounted on exterior 206 of housing 208 of thermographic inspection system 204. Extendable actuator 102 is mounted on exterior 206 of housing 208 of thermographic inspection system 204. Extendable actuator 102 is mounted on exterior 206 of housing 208 either directly or indirectly. As depicted, extendable actuator 102 is mounted to exterior 206 through mounting base structure 132 that mounts extendable actuator 102 to housing 208.

Housing 208 surrounds and forms channel 210. Infrared camera 212 desirably reads IR energy directly from an inspection surface of a structure. The line-of-sight of infrared camera 212 of thermographic inspection system 204 is directed towards second end 214 of housing 208 and extends through channel 210. Thermographic inspection system 204 is associated with first end 216 of housing 208.

In some illustrative examples, a series of successive thermographic inspections is performed in sequence prior to performing an ultrasonic inspection using ultrasonic inspection system 100. In some illustrative examples, ultrasonic inspections are performed in between thermographic inspections of the series of successive thermographic inspections. Each of the series of successive thermographic inspections is of a different region of a surface of a workpiece.

Inconsistencies within thermographic images produced during each of the series of successive thermographic inspections are located. In some illustrative examples, inconsistencies within each thermographic image from a respective thermographic inspection are located substantially in real-time. In these illustrative examples, when inconsistencies are located substantially in real-time, inconsistencies within each thermographic image are located significantly immediately after taking the respective thermographic image. Taking the respective thermographic image is a timed exposure process. In some illustrative examples, taking a thermographic image takes 10 seconds or more. In some other illustrative examples, inconsistencies within each thermographic image are located after each of series of the successive thermographic inspections is performed.

The terms "approximately", "about", and "substantially" as used herein represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount.

Number of distance sensors 218 are also present on robotic end effector 200. As depicted, number of distance sensors 218 take the form of laser sensors. Distance sensors 218 include laser sensor 220, laser sensor 222, and laser sensor 224. The motion of robotic end effector 200 is controlled based in part on distance measurements from distance sensors 218. Motion instructions are generated from the distance measurement from distance sensors 218. A motion controller will then drive robotic end effector 200 within an inspection environment, such as inspection environment 301 of FIGS. 3-8, using the motion instructions. Thus, distance measurements from distance sensors 218 are used to provide the motion controller with the data to generate motion instructions that drive robotic end effector 200 within an inspection environment, such as inspection environment 301 of FIGS. 3-8.

Distance data from number of distance sensors 218 is also used to compute a relative angular value of the relative angle between the surface normal (at the location of robotic end effector 200) and robotic end effector 200. The relative angular value is then used by the controller to rotate robotic end effector 200 to minimize the relative angle in order to place robotic end effector 200 as perpendicular to the surface (not depicted in FIG. 2) as possible. The controller rotates robotic end effector 200 based on the relative angular value to place robotic end effector 200 perpendicular or substantially perpendicular to the inspection surface.

A feedback control system is configured to keep flange-mounted roller 104 in contact with the surface at a specified angle, and to move flange-mounted roller 104 in a pre-defined pattern with respect to the surface. The feedback control system utilizes inverse kinematics computations to follow the surface of the structure. One example of non-limiting inverse kinematic computations the feedback control system could use include equations described with reference to FIG. 9. An example of measurements used by a feedback control system include the measurements depicted in FIG. 9 and FIG. 10. In some illustrative examples, the feedback control system is implemented in a controller, such as controller 1278 of FIG. 12. The feedback control system may be implemented in at least one of hardware or software.

Figure 3:
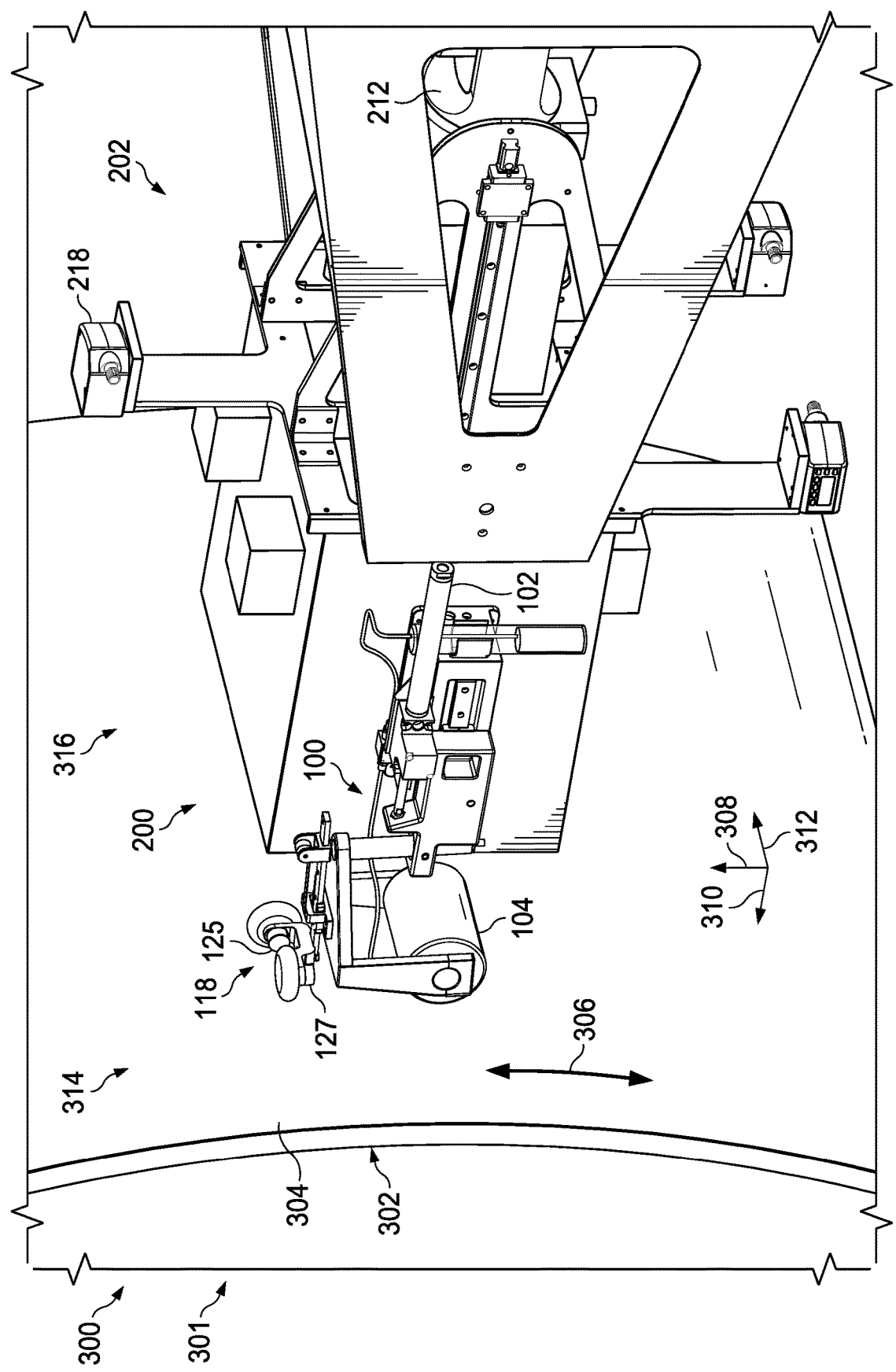
FIG. 3 is an illustration of a side-back orthographic projection view of a non-destructive inspection system including a robotic end effector in accordance with an illustrative embodiment.

Turning now to FIG. 3, an illustration of a side-back orthographic view of a non-destructive inspection system including a robotic end effector is depicted in accordance with an illustrative embodiment. In view 300 of inspection environment 301, structure 302 is visible. Robotic end effector 200 is positioned relative to structure 302 to perform an ultrasonic inspection of inspection surface 304.

As depicted, omni-directional wheels 118 and flange-mounted roller 104 are in contact with inspection surface 304. Robotic end effector 200 is moved relative to inspection surface 304 to roll flange-mounted roller 104 along inspection surface 304. Robotic end effector 200 is moved in direction 306 while maintaining contact between flange-mounted roller 104 and inspection surface 304.

Distance measurements from distance sensors 218 are used to drive robotic end effector 200. Robotic end effector 200 follows inspection surface 304 of structure 302 using distance measurements from distance sensors 218 to inspection surface 304. As a result, robotic end effector 200 can follow inspection surface 304 even without having a model or other surface information regarding structure 302.

Distance measurements are taken from distance sensors 218 of robotic end effector 200 to inspection surface 304. The distance measurements may also be referred to as end effector offset distance measurements.

A rotational angle sensor (not depicted) takes an angular measurement of robotic end effector 200 with respect to the motion base reference. This angular measurement may also be referred to as an absolute angular measurement. A relative angular value is computed using data from distance sensors 218 for surface alignment of robotic end effector 200.

A rotation of robotic end effector 200 is adjusted using the relative angular value. Robotic end effector 200 is rotated so that robotic end effector 200 is perpendicular or substantially perpendicular to inspection surface 304.

A desired vertical position and a desired horizontal position are determined for robotic end effector 200 using the distance measurements, the angular measurement, a desired offset distance, an initial pitch angle, an initial horizontal position, and an initial vertical position. Afterwards, robotic end effector 200 is driven to the desired vertical position and the desired horizontal position. The desired vertical position is a location in Z-axis 308. The desired horizontal position is a location in Y-axis 310. X-axis 312 is also depicted in view 300. In some illustrative examples, flange-mounted roller 104 of robotic end effector 200 is moved away from inspection surface 304 prior to moving robotic end effector 200 in X-axis 312. Each of Z-axis 308, Y-axis 310, and X-axis 312 are part of a coordinate system for manufacturing environment 314.

By driving to the desired vertical position and the desired horizontal position, robotic end effector 200 is moved in direction 306. By moving to the desired vertical position and the desired horizontal position, flange-mounted roller 104 is maintained against inspection surface 304.

The desired vertical position and the desired horizontal position, along with the distance feedback from distance sensors 218, maintain robotic end effector 200 a desired offset distance from inspection surface 304. Rotating robotic end effector 200 based on the relative angular value maintains an orientation of robotic end effector 200 relative to inspection surface 304. As depicted, robotic end effector 200 is desirably perpendicular or substantially perpendicular to inspection surface 304.

After inspecting a portion of inspection surface 304 by moving robotic end effector 200 in direction 306, flange-mounted roller 104 is removed from inspection surface 304. After moving flange-mounted roller 104, robotic end effector 200 may be moved along X-axis 312. After moving robotic end effector 200 along X-axis 312, flange-mounted roller 104 may be placed in contact with inspection surface 304. Flange-mounted roller 104 may then be moved in direction 306 to inspect a second portion of inspection surface 304 of structure 302. When robotic end effector 200 is moved along x-axis 312, the omni-directional wheels stay in contact with inspection surface 304.

Non-destructive inspection system 316 comprises robotic end effector 200 having extendable actuator 102 and flange-mounted roller 104 containing an ultrasonic sensor. Although not depicted in FIG. 3, in some examples non-destructive inspection system 316 also includes a movement system connected to robotic end effector 200, the movement system configured to move robotic end effector 200 relative to inspection surface 304 of a structure 302.

Figure 4:
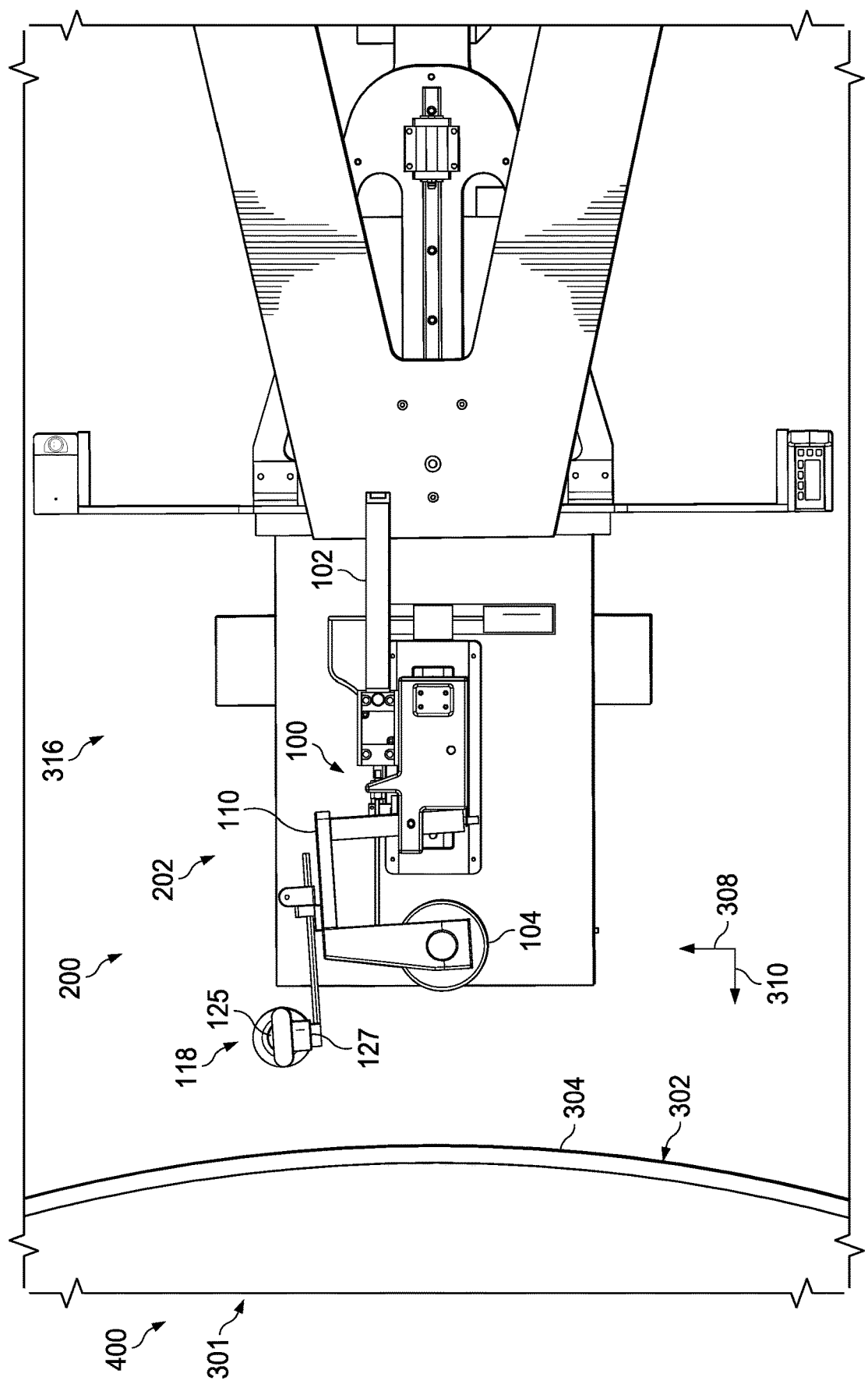
FIG. 4 is an illustration of a side view of a non-destructive inspection system including a robotic end effector and an inspection surface in accordance with an illustrative embodiment.

Turning now to FIG. 4, an illustration of a side view of a non-destructive inspection system including a robotic end effector and an inspection surface is depicted in accordance with an illustrative embodiment. View 400 within inspection environment 301 is a side view of robotic end effector 200 of non-destructive inspection system 316. In view 400, robotic end effector 200 is not in contact with inspection surface 304 of structure 302.

Omni-directional wheels 118 are extended past second end 214 of housing 208. In view 400, base 110 does not extend past second end 214 of housing 208. In view 400, flange-mounted roller 104 is positioned between first end 216 and second end 214 of housing 208.

Figure 5:
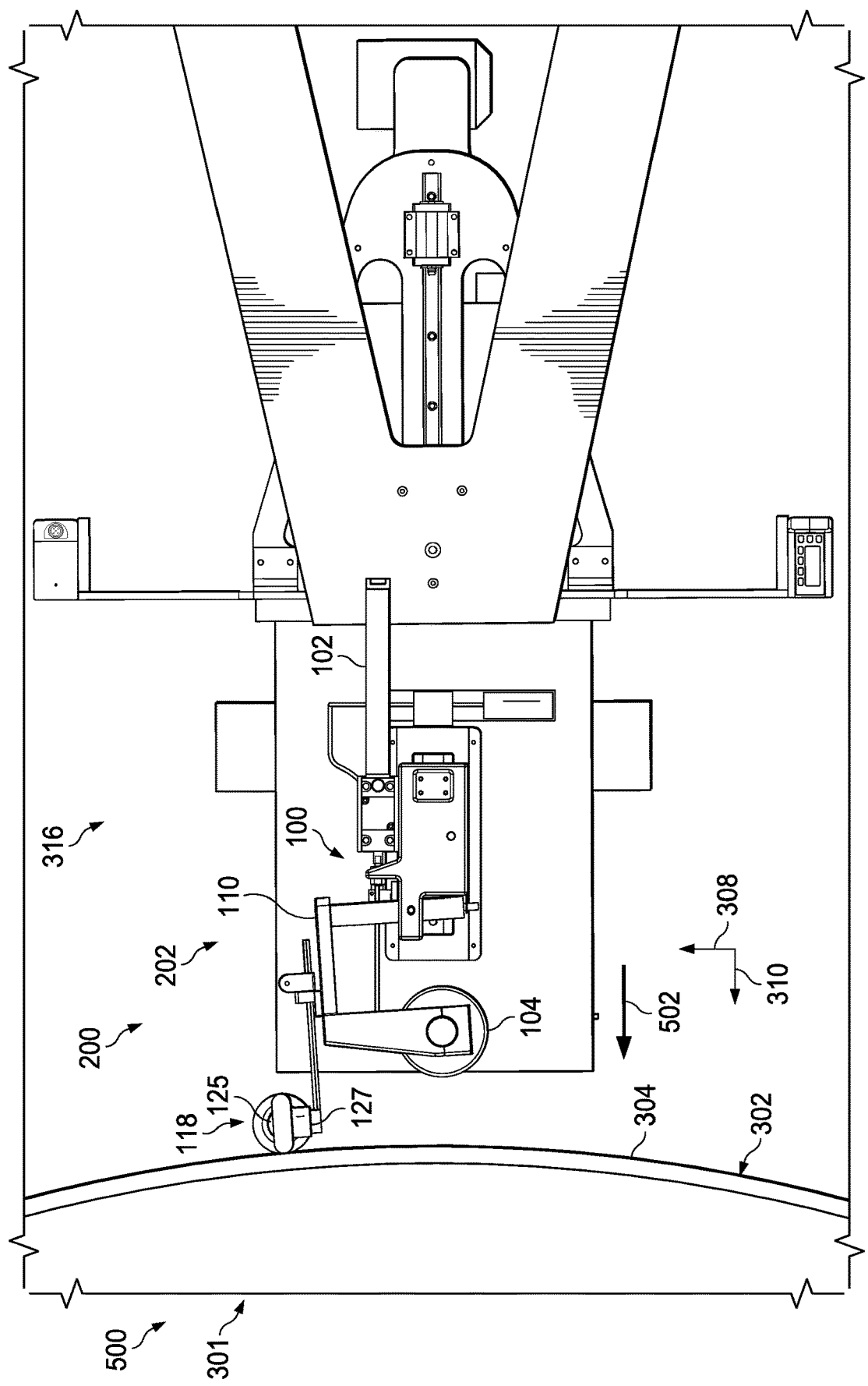
FIG. 5 is an illustration of a side view of a non-destructive inspection system including a robotic end effector with a number of omni-directional wheels in contact with an inspection surface in accordance with an illustrative embodiment.

Turning now to FIG. 5, an illustration of a side view of a non-destructive inspection system including a robotic end effector with a number of omni-directional wheels in contact with an inspection surface is depicted in accordance with an illustrative embodiment. Between view 400 and view 500, robotic end effector 200 of non-destructive inspection system 316 has moved in direction 502 substantially along Y-axis 310 towards inspection surface 304. In view 500 of inspection environment 301, omni-directional wheels 118 are in contact with inspection surface 304. In view 500, robotic end effector 200 has been moved in direction 502 by a movement system (not depicted) connected to robotic end effector 200.

Although robotic end effector 200 has been moved between view 400 and view 500, in some other illustrative examples, extendable actuator 102 moves omni-directional wheels 118 into contact with inspection surface 304. In some of these non-depicted illustrative examples, extendable actuator 102 is an actuator selected to move into multiple positions. In these non-depicted illustrative examples, extendable actuator 102 may be a type of actuator other than a pneumatic actuator, such as an electric motor. In some of these non-depicted illustrative examples, housing 208 of robotic end effector 200 remains stationary while omni-directional wheels 118 are placed into contact with inspection surface 304.

Figure 6:
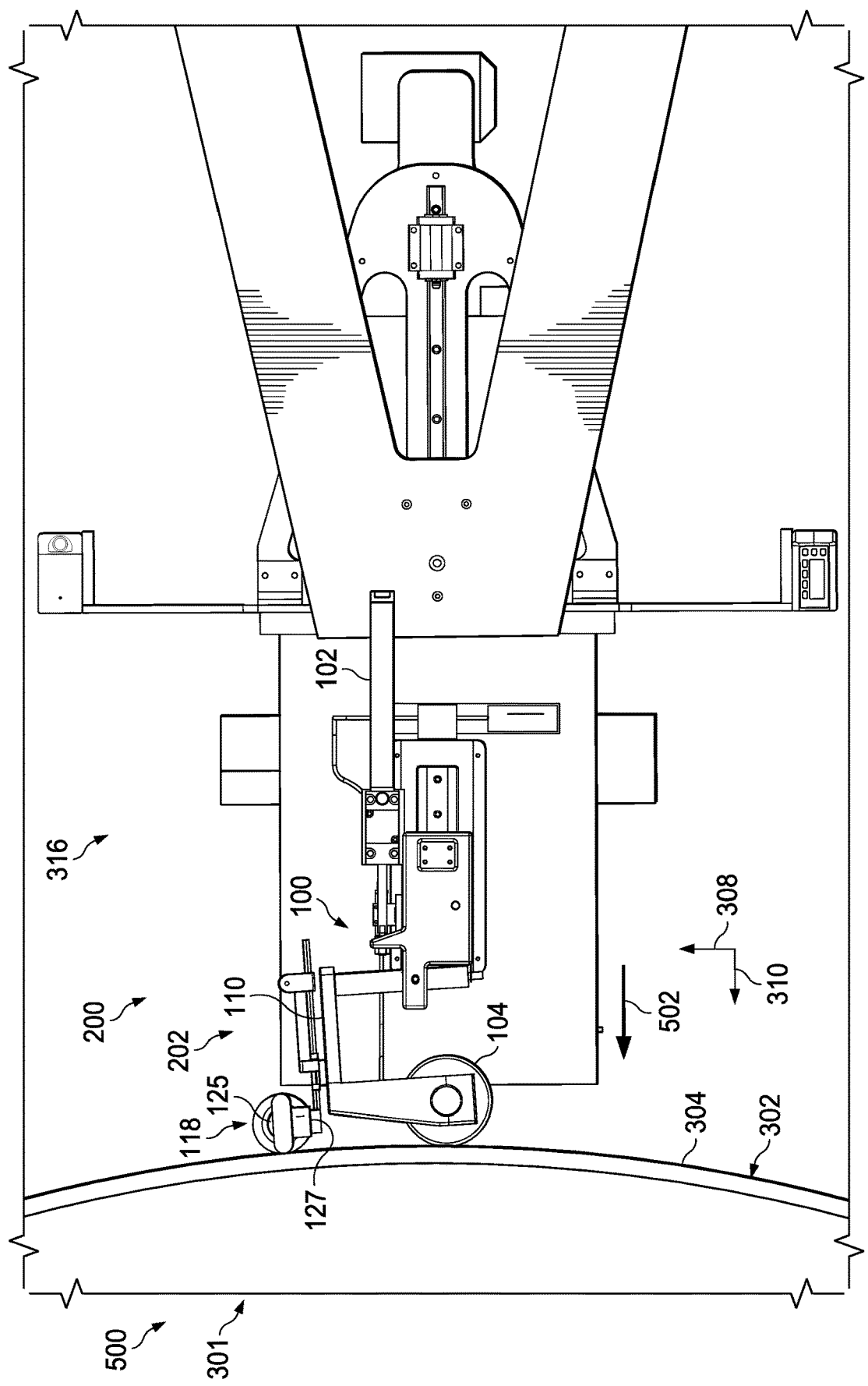
FIG. 6 is an illustration of a side view of a non-destructive inspection system including a robotic end effector with a flange-mounted roller and a number of omni-directional wheels in contact with an inspection surface in accordance with an illustrative embodiment.

Turning now to FIG. 6, an illustration of a side view of a non-destructive inspection system including a robotic end effector with a flange-mounted roller and a number of omni-directional wheels in contact with an inspection surface is depicted in accordance with an illustrative embodiment. In view 600 of inspection environment 301, flange-mounted roller 104 is in contact with inspection surface 304. Between view 500 and view 600, flange-mounted roller 104 has moved in direction 502. Between view 500 and view 600, extendable actuator 102 has moved base 110 in direction 502. In view 600, a portion of base 110 extends past second end 214 of housing 208.

Figure 7:
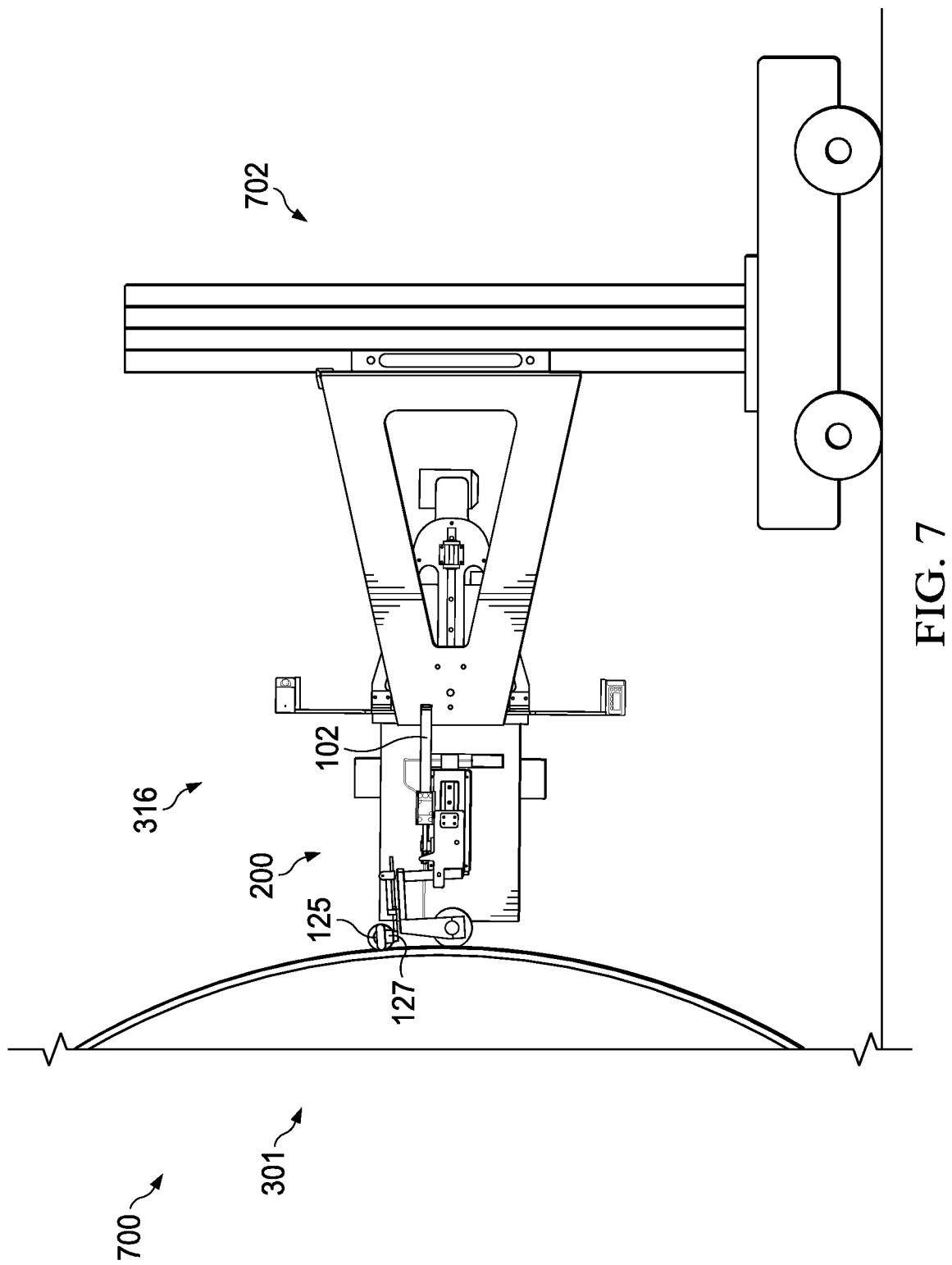
FIG. 7 is an illustration of a side view of a non-destructive inspection system with a robotic end effector on a movement system in accordance with an illustrative embodiment.

Turning now to FIG. 7, an illustration of a side view of a non-destructive inspection system with a robotic end effector on a movement system is depicted in accordance with an illustrative embodiment. In view 700 of inspection environment 301, movement system 702 of non-destructive inspection system 316 is visible. In view 700, robotic end effector 200 is connected to movement system 702. Movement system 702 takes the form of a robotic vehicle with a vertical elevator.

Figure 8:
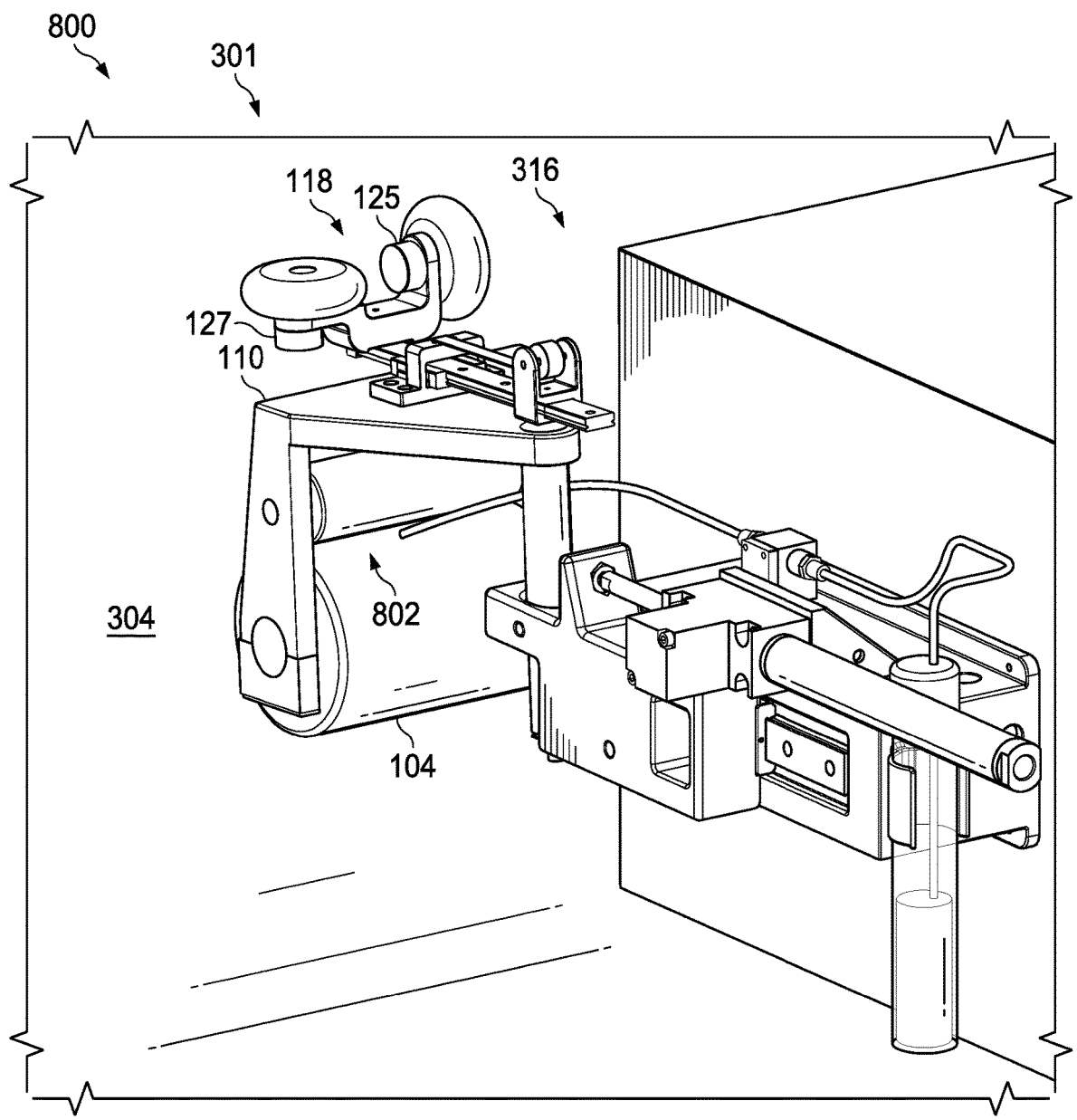
FIG. 8 is an illustration of a back view of a non-destructive inspection system including a robotic end effector with a flange-mounted roller and a number of omni-directional wheels in contact with an inspection surface in accordance with an illustrative embodiment.

Turning now to FIG. 8, an illustration of a back view of a non-destructive inspection system including a robotic end effector with a flange-mounted roller and a number of omni-directional wheels in contact with an inspection surface is depicted in accordance with an illustrative embodiment. In view 800 of inspection environment 301, robotic end effector 200 flange-mounted roller 104 is in contact with inspection surface 304. As depicted, robotic end effector 200 has additional components forming stabilizing system 802, connected to base 110 and providing compliant contact between robotic end effector 200 and inspection surface 304. Stabilizing system 802 is positioned between omni-directional wheels 118 and flange-mounted roller 104.

Figure 9:
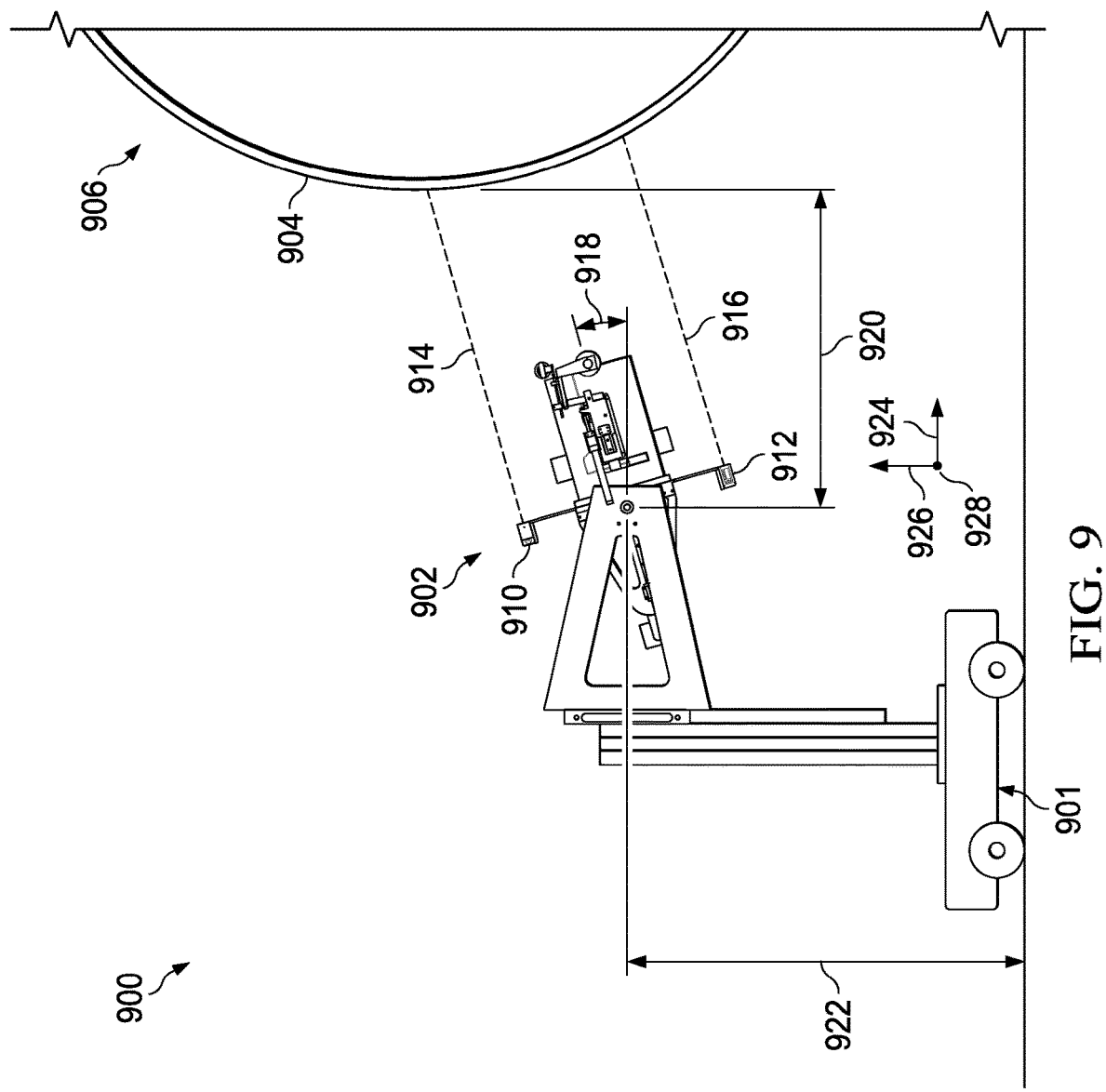
FIG. 9 is an illustration of a side view of a non-destructive inspection system including a robotic end effector on a movement system relative to an inspection surface of a structure with measurements marked in accordance with an illustrative embodiment.

Turning now to FIG. 9, an illustration of a side view of a non-destructive inspection system including a robotic end effector on a movement system relative to a surface of a structure with measurements marked is depicted in accordance with an illustrative embodiment. In some illustrative examples, robotic end effector 902 in view 900 is the same as robotic end effector 200 of FIG. 2. In some illustrative examples, robotic end effector 902 is different from robotic end effector 200 of FIG. 2. View 900 is a view from an opposite side of FIGS. 1-8. For example, if FIG. 2 is a view from a "left" side, FIG. 9 is a view from a "right" side.

In view 900, robotic end effector 902 is following surface 904 of structure 906. Robotic end effector 902 is configured to perform an operation on surface 904. The operation may be applying a coating, drilling, routing, cleaning, performing an inspection, or any other desirable operation.

Robotic end effector 902 follows surface 904 without prior knowledge of the shape of surface 904. Robotic end effector 902 follows surface 904 without shape information such as a CAD model.

A feedback control system is configured to maintain a relative angle between robotic end effector 902 and surface 904 at a specified angle, and to move robotic end effector 902 in a pre-defined pattern with respect to surface 904. The feedback control system utilizes inverse kinematics computations to follow surface 904 of structure 906. In some illustrative examples, the feedback control system is implemented in a controller, such as controller 1278 of FIG. 12. The feedback control system may be implemented in at least one of hardware or software.

To follow surface 904, distance measurements are taken from number of distance sensors 908 of robotic end effector 902 to surface 904. The distance measurements may also be referred to as end effector offset distance measurements. As depicted, robotic end effector 902 has distance sensor 910 and distance sensor 912. Distance sensor 910 takes distance measurement 914. Distance sensor 912 takes distance measurement 916. Although only two distance sensors are depicted, robotic end effector 902 may include any desirable quantity of distance sensors. For example, a distance sensor may be mounted in a parallel configuration to distance sensor 910 on the opposite side of robotic end effector 902, separated by a known distance. This configuration allows the system to be able to measure vertical axis alignment between the robotic end effector 902 and surface 904.

Distance data from number of distance sensors 908 is used to compute a relative angular value for the relative angle between surface 904 normal (at the location of robotic end effector 902) and robotic end effector 902. The relative angular value is then used by the controller to rotate robotic end effector 902 to minimize that angle in order to make robotic end effector 902 as perpendicular as possible to surface 904.

A rotational angle sensor (not depicted) in the wrist joint of robotic end effector 902 is used measure the absolute angle, angular measurement 918, of robotic end effector 902 with respect to the floor. Angular measurement 918 is used for inverse kinematics computation to determine a desired vertical displacement and a desired horizontal displacement of motion base 901 that supports robotic end effector 902. The desired vertical position and the desired horizontal position are determined using angular measurement 918.

Angular measurement 918 between robotic end effector 902 and surface 904 is taken using a rotational angle sensor (not depicted). A desired vertical position and a desired horizontal position are determined for robotic end effector 902 using the distance measurements 914, 916, angular measurement 918 between robotic end effector 902 and surface 904, a desired offset distance, an initial end effector pitch angle, an initial horizontal position 920, and an initial vertical position 922. In view 900, x-axis 928, y-axis 924, and z-axis 926 are depicted. X-axis 928, y-axis 924, and z-axis 926 are coordinates within manufacturing environment 930.

Robotic end effector 902 is moved to follow surface 904 of structure 906 while maintaining a desired offset distance. In some illustrative examples, robotic end effector 902 has a flange-mounted roller. In these illustrative examples, robotic end effector 902 is moved relative to surface 904 in order to roll the flange-mounted roller across surface 904. In these illustrative examples, moving robotic end effector 902 relative to surface 904 comprises driving motion base 901, to which robotic end effector 902 is mounted, in order to move robotic end effector 902 to the desired vertical position and the desired horizontal position.

In some illustrative examples, robotic end effector 902 is a component of a non-destructive inspection system (not depicted). In some of these illustrative examples, ultrasonic inspection data of surface 904 is generated as robotic end effector 902 is driven to the desired vertical position and the desired horizontal position.

The desired vertical position and the desired horizontal position for robotic end effector 902 is determined using any desirable method taking into account a desired offset distance and a desired angle of robotic end effector 902 relative to surface 904. In some illustrative examples, the desired vertical position and the desired horizontal position for robotic end effector 902 are determined using the equations:

$$d_y = \text{dist}*\cos(\text{Ang}) - \text{dist}_{init}*\cos(\text{Ang}_{init}) - dS*\sin(\text{Ang}_{init})$$

$$d_z = \text{dist}*\sin(\text{Ang}) - \text{dist}_{init}*\sin(\text{Ang}_{init}) + dS*\cos(\text{Ang}_{init})$$

$$Y_{pos} = Y_{pos\_init} + d_y$$

$$Z_{pos} = Z_{pos\_set} + d_z$$

wherein dist is an offset distance determined from the distance measurements, dist_init is a desired offset distance, Ang is the angular measurement between the robotic end effector and the inspection surface, Ang_init is the initial end effector pitch angle, $Y_{pos\_init}$ is the initial horizontal position, $Z_{pos\_set}$ is the initial vertical position, $Y_{pos}$ is the desired horizontal position, $Z_{pos}$ is the desired vertical position, and dS is the specified move distance from the current position along the surface. dS=V*Δt, where V is velocity and Δt is the change in time (time step for the loop update).

As robotic end effector 902 follows surface 904, measurements are repeatedly taken and values calculated to maintain a desired surface offset distance and maintain a substantially perpendicular angle relative to surface 904. As robotic end effector 902 follows surface 904, distance measurements are repeatedly taken, relative angular values are repeatedly computed, absolute angular measurements are repeatedly taken, and desired vertical positions and desired horizontal positions are determined. Rotation of robotic end effector 902 is continuously performed as robotic end effector 902 is continuously moved to the desired vertical positions and horizontal positions. The desired vertical positions and horizontal positions are calculated based on changes in vertical and horizontal displacement to maintain the desired surface offset distance to follow surface 904.

After moving robotic end effector 902 to the desired vertical position and the desired horizontal position, additional distance measurements are taken to the surface using number of distance sensors 908 of the robotic end effector 902. An additional relative angular value is computed. An additional angular measurement of robotic end effector 902 is taken using the rotational angle sensor (not depicted). A subsequent vertical position and a subsequent horizontal position for robotic end effector 902 is determined using the additional distance measurements, the additional angular measurement, the desired offset distance, the initial pitch angle, the initial horizontal position, and the initial vertical position. Robotic end effector 902 is driven to the subsequent vertical position and the subsequent horizontal position.

In some illustrative examples, robotic end effector 902 is a component of a non-destructive inspection system. In these illustrative examples, non-destructive inspections are performed as robotic end effector 902 follows surface 904. In some illustrative examples, ultrasonic inspection data of surface 904 is generated as robotic end effector 902 is driven to the desired vertical position and the desired horizontal position.

In some illustrative examples, ultrasonic inspection system 100 of FIG. 1 is a component of robotic end effector 902. In these illustrative examples, generating ultrasonic inspection data of surface 904 comprises rolling a flange-mounted roller of robotic end effector 902 containing an ultrasonic sensor along the surface, wherein the flange-mounted roller is connected to an extendable actuator of robotic end effector 902 by a pivot connection, and wherein the extendable actuator extends the flange-mounted roller until the flange-mounted roller contacts surface 904.

Figure 10:
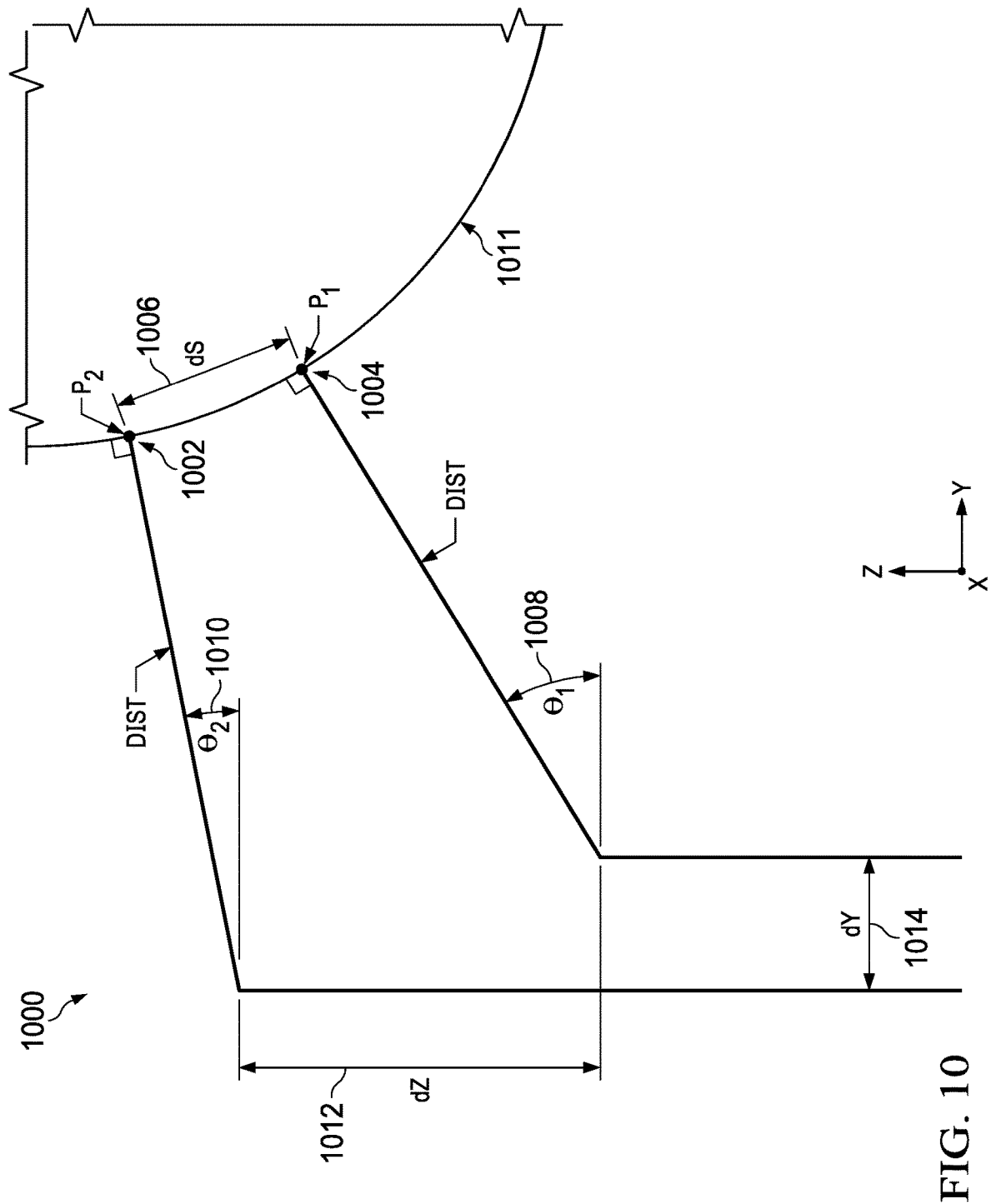
FIG. 10 is an illustration of a side view of measurements of a robotic end effector while the robotic end effector is positioned relative to an inspection surface of a structure in accordance with an illustrative embodiment.

Turning now to FIG. 10, an illustration of a side view of measurements of a robotic end effector while the robotic end effector is positioned relative to an inspection surface of a structure is depicted in accordance with an illustrative embodiment. View 1000 is an example of a geometry diagram showing a movement of an end effector relative to a surface of the structure. $P_1$ 1002 is a first end effector surface contact point. $P_2$ 1004 is a second end effector surface contact point. The movement of the end effector surface contact point from P 1002 to $P_2$ 1004 is a distance dS 1006. As the end effector surface contact point moves from $P_1$ 1002 to $P_2$ 1004, end effector alignment process is working to simultaneously keep the robotic end effector aligned perpendicular to the surface.

The end effector alignment process utilizes multiple distance measurements of the robotic end effector to surface 1011 to determine a relative angle of the robotic end effector to surface 1011. The multiple distance measurements are taken with multiple distance sensors, such as distance sensors 218 of FIG. 2.

During the move from $P_1$ 1002 to $P_2$ 1004 by distance dS 1006, the end effector alignment changes from the initial absolute angle 1008 of $\Theta_1$ to new absolute angle 1010 $\Theta_2$. Initial absolute angle 1008 of $\Theta_1$ and new absolute angle 1010 $\Theta_2$ are measured by an absolute angle sensor. Initial absolute angle 1008 of $\Theta_1$ and new absolute angle 1010 $\Theta_2$ are measured with respect to the mobile platform base, which is parallel the manufacturing floor.

To follow surface 1011, vertical distance changes by dZ 1012 and horizontal distance changes by dY 1014, as calculated by inverse kinematics equations. After moving vertical distance dZ 1012 and horizontal distance dY 1014, it is determined if it's desirable to continue motion of the robotic end effector. If the robotic end effector has completed the desired toolpath, motion is stopped. If the robotic end effector has not yet completed the desired toolpath, the robotic end effector is moved to desired horizontal and vertical locations based on inverse kinematics equations.

Figure 11:
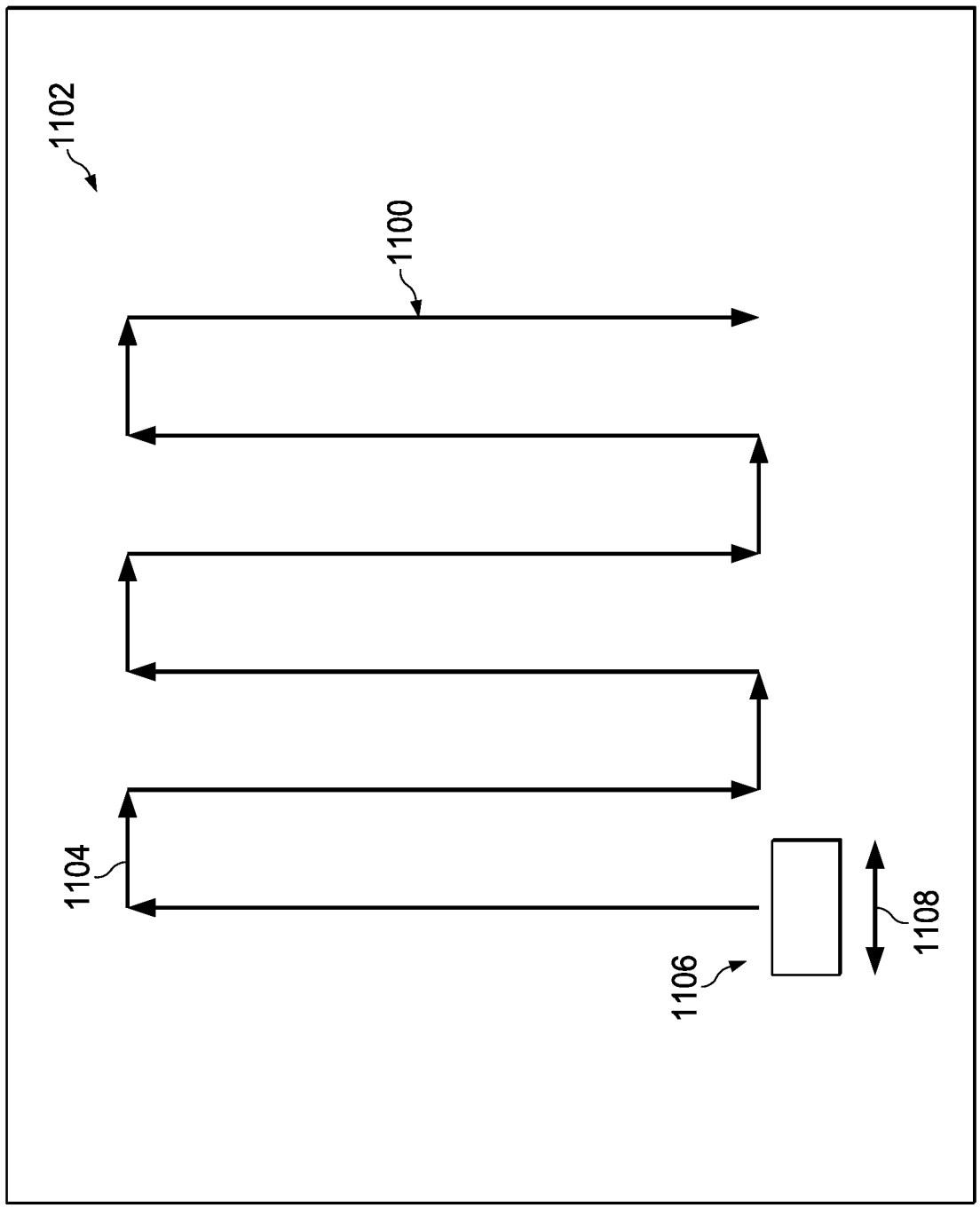
FIG. 11 is an illustration of a view normal to an inspection surface with a toolpath depicted in accordance with an illustrative embodiment.

Turning now to FIG. 11, an illustration of a view normal (perpendicular) to an inspection surface with a toolpath depicted is depicted in accordance with an illustrative embodiment. Toolpath 1100 of FIG. 11 is one non-limiting example of a path a robotic end effector, such as robotic end effector 200 of FIGS. 2-8. Toolpath 1100 of FIG. 11 is one non-limiting example of a path that robotic end effector 1206 of FIG. 12 may follow. Toolpath 1100 may be referred to as a serpentine path.

In some illustrative examples, a component of the robotic end effector configured to perform an operation on the structure is in contact with surface 1102 as the robotic end effector is moved along toolpath 1100. For example, when an ultrasonic sensor is present on the robotic end effector, the ultrasonic sensor is in contact with surface as the robotic end effector moves along toolpath 1100.

In some illustrative examples, a component of the robotic end effector configured to perform an operation on the structure is in contact with surface 1102 for only portions of toolpath 1100. In some illustrative examples, a component of the robotic end effector configured to perform an operation on the structure is not in contact with surface 1102 when the robotic end effector travels along connecting segments 1104 of toolpath 1100. For example, when the robotic end effector comprises roller 1106, roller 1106 is not in contact with surface 1102 as the robotic end effector travels along connecting segments 1104 of toolpath 1100.

In some illustrative examples, a component of the robotic end effector configured to perform an operation on the structure is not in contact with surface 1102 as robotic end effector moves along toolpath 1100. For example, when the robotic end effector performs a spraying operation, the sprayer of the robotic end effector is not in contact with surface 1102.

Toolpath 1100 is a predetermined path selected to perform an operation having a desirable quality on surface 1102. Length of connecting segments 1104 is selected based on the dimensions of the component configured to perform the operation on the structure. For example, length of connecting segments 1104 may be selected based on length 1108 of roller 1106.

Toolpath 1100 is set independent of a curvature of surface 1102. The robotic end effector travels along toolpath 1100 using the inverse kinematics computations. The robotic end effector travels along toolpath 1100 based on the measurements of angular and distance sensors. The inverse kinematics computations are used to determine a desired vertical displacement and a desired horizontal displacement such that the robotic end effector is desirably positioned relative to surface 1102 as the robotic end effector travels along toolpath 1100. In some illustrative examples, toolpath 1100 is travelled by the robotic end effector without prior knowledge of the shape of surface 1102.

Figure 12:
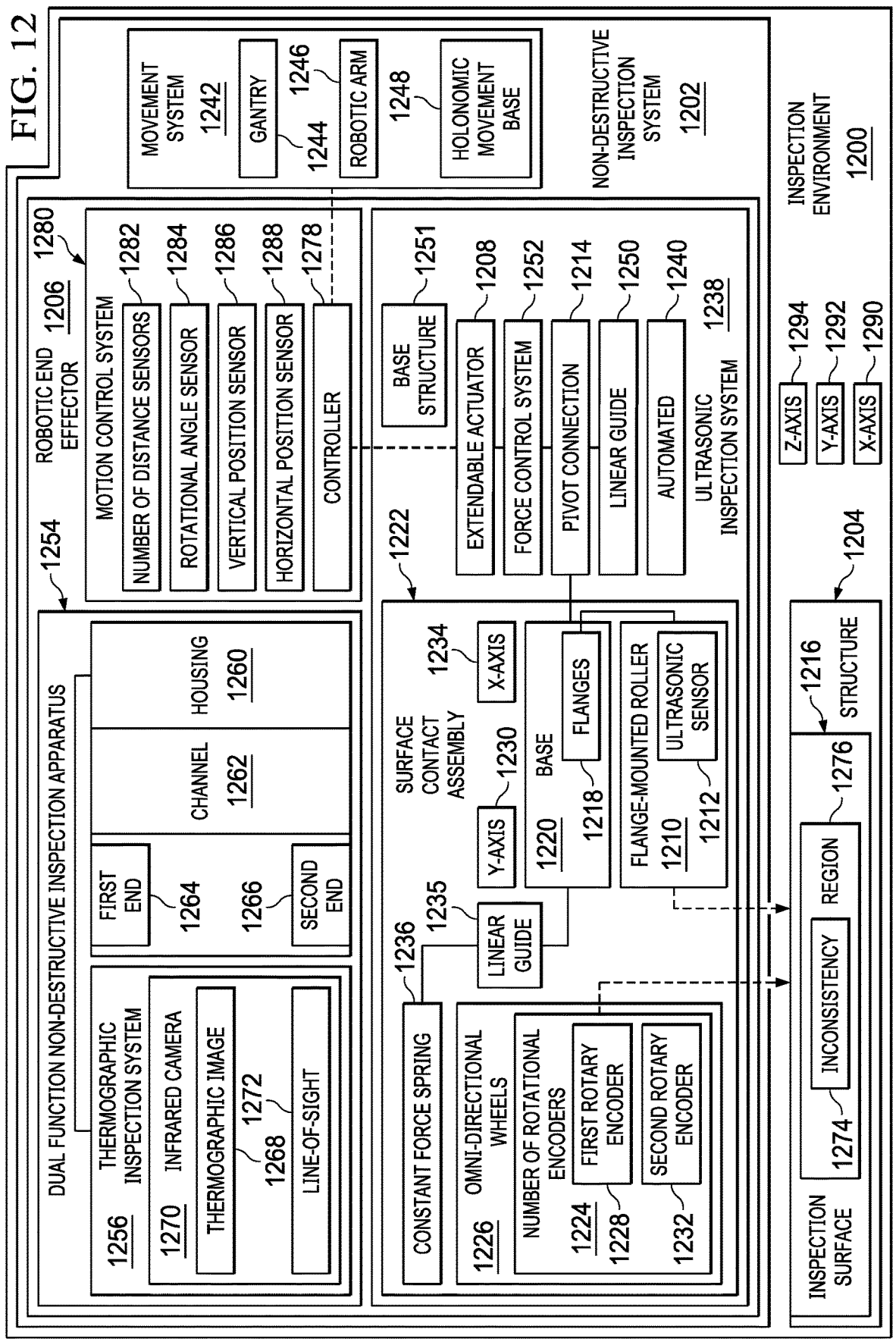
FIG. 12 is an illustration of a block diagram of an inspection environment in which a workpiece is inspected in accordance with an illustrative example.

Turning now to FIG. 12, an illustration of a block diagram of an inspection environment in which a workpiece is inspected is depicted in accordance with an illustrative example. Inspection environment 301 of FIGS. 3-8 is one implementation of inspection environment 1200.

Inspection environment 1200 includes non-destructive inspection system 1202 configured to inspect a structure, such as structure 1204. Non-destructive inspection system 316 of FIGS. 3-8 is one non-limiting example of non-destructive inspection system 1202. Non-destructive inspection system 1202 comprises robotic end effector 1206 having extendable actuator 1208 and flange-mounted roller 1210 containing ultrasonic sensor 1212. Flange-mounted roller 1210 is connected to extendable actuator 1208 by pivot connection 1214. Extendable actuator 1208 is configured to extend flange-mounted roller 1210 until flange-mounted roller 1210 contacts inspection surface 1216. Although surface of structure 1204 is referred to as inspection surface 1216, in some illustrative examples, inspection surface 1216 may be referred to as a surface.

Flange-mounted roller 1210 is mounted to flanges 1218 of base 1220 of surface contact assembly 1222. Surface contact assembly 1222 is connected to extendable actuator 1208 by pivot connection 1214. Pivot connection 1214 allows for rotation of flange-mounted roller 1210 relative to extendable actuator 1208 so that flange-mounted roller 1210 can follow a curvature of inspection surface 1216.

Surface contact assembly 1222 is connected to extendable actuator by a sliding structure (not depicted) and pivot connection 1214. Number of rotational encoders 1224 is connected to base 1220 by linear guide 1235 and constant force spring 1236.

Robotic end effector 1206 further comprises number of rotational encoders 1224 mounted on omni-directional wheels 1226 configured to contact inspection surface 1216 and track movement displacement of robotic end effector 1206 relative to inspection surface 1216.

Number of rotational encoders 1224 comprises first rotary encoder 1228 positioned to rotate about horizontal axis 1230 to measure vertical displacement and second rotary encoder 1232 positioned to rotate about a vertical axis 1234 to measure horizontal displacement. Horizontal axis 1230 and vertical axis 1234 are referenced to surface contact assembly 1222. As robotic end effector 1206 moves within inspection environment 1200, horizontal axis 1230 and vertical axis 1234 will move within inspection environment 1200.

Number of rotational encoders 1224 is connected to base 1220 by linear guide 1235 and constant force spring 1236. Constant force spring 1236 is configured to provide a desired force against inspection surface 1216 by omni-directional wheels 1226 as base 1220 moves relative to number of omni-directional wheels 1226 and associated rotational encoders 1224. Constant force spring 1236 is configured to provide a desired force against inspection surface 1216 by omni-directional wheels 1226 as omni-directional wheels 1226 and rotational encoders 1224 move relative to inspection surface 1216. In some illustrative examples, omni-directional wheels 1226 are mounted on a structure attached to linear guide 1235. Constant force spring 1236 is also connected to linear guide 1235.

Surface contact assembly 1222 and extendable actuator 1208 are components of ultrasonic inspection system 1238. Ultrasonic inspection system 1238 is automated 1240. Ultrasonic inspection system 1238 performs ultrasonic inspections of structure 1204 automatically.

Non-destructive inspection system 1202 further comprises movement system 1242 connected to robotic end effector 1206. Movement system 1242 is configured to move robotic end effector 1206 relative to inspection surface 1216 of structure 1204. Movement system 1242 takes the form of any desirable quantity or type of movement devices or structures. In some illustrative examples, movement system 1242 comprises gantry 1244. In some illustrative examples, movement system 1242 comprises robotic arm 1246. In some other illustrative examples, movement system 1242 comprises holonomic motion base 1248. In some illustrative examples, movement system 1242 comprises a vertical elevator.

Movement system 1242 moves and positions robotic end effector 1206 relative to structure 1204. Structure 1204 has any desirable size, shape, and material. In some illustrative examples, structure 1204 is a composite structure. In some illustrative examples, structure 1204 is a metal structure. In some illustrative examples, structure 1204 is a component of an aircraft.

At least one of movement system 1242 or extendable actuator 1208 is used to apply flange-mounted roller 1210 to inspection surface 1216. A desirable pressure is maintained by flange-mounted roller 1210 against inspection surface 1216. In some illustrative examples, additional components are present in ultrasonic inspection system 1238 to maintain a desirable pressure against inspection surface 1216 and control application of pressure by extendable actuator 1208. In some illustrative examples, linear guide 1250 is present to restrict movement of pivot connection 1214 to one axis. A sliding structure (not depicted) rides along linear guide 1250 and connects extendable actuator 1208 to pivot connection 1214. Linear guide 1250 permits movement of the sliding structure in a single direction. Linear guide 1250 and extendable actuator 1208 are mounted on base structure 1251. Base structure 132 of FIG. 1 is a physical implementation of base structure 1251. Base structure 1251 is secured to any desirable movement system. For example, base structure 1251 may be secured to housing 208 of FIG. 2. Base structure 132 may be part of an end effector.

In some illustrative examples, force control system 1252 is present to maintain a desirable force by flange-mounted roller 1210 on inspection surface 1216. Force control system 1252 takes any desirable form. In some illustrative examples, force control system 1252 takes the form of a constant force spring.

In some illustrative examples, robotic end effector 1206 comprises dual function non-destructive inspection apparatus 1254. When robotic end effector 1206 comprises dual function non-destructive inspection apparatus 1254, robotic end effector 1206 is configured to perform two different types of non-destructive inspections on structure 1204.

In some illustrative examples, dual function non-destructive inspection apparatus 1254 comprises thermographic inspection system 1256 and ultrasonic inspection system 1238. Thermographic inspection system 1256 and ultrasonic inspection system 1238 are incorporated into dual function non-destructive inspection apparatus 1254 in any desirable fashion. In some illustrative examples when robotic end effector 1206 further comprises thermographic inspection system 1256, extendable actuator 1208 is mounted on an exterior of housing 1258 of thermographic inspection system 1256.

Dual function non-destructive inspection apparatus 1254 has housing 1260, thermographic inspection system 1256, and ultrasonic inspection system 1238. Housing 1260 has channel 1262, first end 1264, and second end 1266. Channel 1262 extends through housing 1260 from first end 1264 to second end 1266.

Thermographic inspection system 1256 is associated with first end 1264 of housing 1260. Ultrasonic inspection system 1238 is connected to housing 1260 such that flange-mounted roller 1210 and omni-directional wheels 1226 can extend past second end 1266 of housing 1260. Flange-mounted roller 1210 is moved towards second end 1266 in a direction parallel to channel 1262 by extendable actuator 1208. Movement of flange-mounted roller 1210 in directions perpendicular to channel 1262 is performed by movement of robotic end effector 1206 by movement system 1242.

Dual function non-destructive inspection apparatus 1254 is moved relative to structure 1204 to perform a series of successive thermographic inspections of inspection surface 1216 of structure 1204. Thermographic images, such as thermographic image 1268 are taken using infrared camera 1270. Line-of-sight 1272 of infrared camera 1270 of thermographic inspection system 1256 is directed towards second end 1266 and extends through channel 1262 of housing 1260.

In some illustrative examples, series of successive thermographic inspections are performed in sequence prior to performing an ultrasonic inspection using Ultrasonic inspection system 1238. In some illustrative examples, ultrasonic inspections are performed in between thermographic inspections of series of successive thermographic inspections. Each of series of successive thermographic inspections is of a different region of inspection surface 1216 of structure 1204.

Inconsistencies within thermographic images produced during each of series of successive thermographic inspections are located. In some illustrative examples, inconsistencies within each thermographic image from a respective thermographic inspection are located substantially in real-time. In these illustrative examples, when inconsistencies are located substantially in real-time, inconsistencies within each thermographic image are located significantly immediately after taking the respective thermographic image. Taking the respective thermographic image is a timed exposure process. In some illustrative examples, taking a thermographic image takes 10 seconds or more. In some other illustrative examples, inconsistencies within each thermographic image are located after each of series of successive thermographic inspections is performed.

In some illustrative examples, inconsistency 1274 in region 1276 is located using thermographic image 1268, where thermographic image areas having pixilation with high contrast in intensity may be indicative of inconsistencies such as voids, porosity, delamination or wrinkles. In some illustrative examples, inconsistency 1274 is located substantially in real-time. When inconsistencies are located substantially in real-time, inconsistencies within each thermographic image are located significantly immediately after taking the respective thermographic image. In some illustrative examples, inconsistency 1274 is located after series of successive thermographic inspections is completed.

An ultrasonic inspection is performed of inconsistency 1274 using Ultrasonic inspection system 1238 of dual function non-destructive inspection apparatus 1254 after locating inconsistency 1274 in the thermographic image and correlating to a location on the structure 1204. In some illustrative examples, Ultrasonic inspection system 1238 performs the ultrasonic inspection in response to locating inconsistency 1274. Ultrasonic inspection system 1238 is driven to a position corresponding to the location of the identified inconsistency 1274 by moving robotic end effector 1206. Flange-mounted roller 1210 is extended towards structure 1204 by extendable actuator 1208.

As depicted, dual function non-destructive inspection apparatus 1254 includes controller 1278. Controller 1278 is configured to control at least one of thermographic inspection system 1256, ultrasonic inspection system 1238, or movement system 1242. For example, controller 1278 may control performance of series of successive thermographic inspections by thermographic inspection system 1256. As another example, controller 1278 may control movement of ultrasonic inspection system 1238 by movement system 1242 as ultrasonic inspection system performs ultrasonic inspections of inspection surface 1216. As a further example, controller 1278 may control movement of flange-mounted roller 1210 by extendable actuator 1208. In some illustrative examples, controller 1278 of dual function non-destructive inspection apparatus 1254 controls the ultrasonic inspection of an inconsistency based on location data determined from a thermographic image.

Controller 1278 may be implemented in at least one of hardware or software. Controller 1278 may be a processor unit in a computer system or a custom circuit depending on the particular implementation. In some implementations of controller 1278, the software to control the motion of dual function non-destructive inspection apparatus 1254 and manage the sequencing of inspections may be through the use of a finite state machine.

As depicted, controller 1278 is part of motion control system 1280 of non-destructive inspection system 1202. As depicted, motion control system 1280 comprises number of distance sensors 1282, rotational angle sensor 1284, and controller 1278. Controller 1278 is configured to receive data from number of distance sensors 1282 and rotational angle sensor 1284, determine subsequent vertical positions and subsequent horizontal positions to follow inspection surface 1216, and sending commands to movement system 1242 to move robotic end effector 1206 to follow inspection surface 1216 of structure 1204.

In some illustrative examples, controller 1278 may be referred to as a feedback control system. The feedback control system is configured to keep flange-mounted roller 1210 in contact with inspection surface 1216 of structure 1204 at a specified angle, and to move flange-mounted roller 1210 in a pre-defined pattern with respect to inspection surface 1216. The feedback control system utilizes inverse kinematics computations to follow inspection surface 1216 of structure 1204. One example of non-limiting inverse kinematic computations the feedback control system could use include equations described with reference to FIG. 9. An example of measurements used by a feedback control system include the measurements depicted in FIG. 9 and FIG. 10.

As depicted, motion control system 1280 also includes vertical position sensor 1286 and horizontal position sensor 1288. Vertical position sensor 1286 and horizontal position sensor 1288 are configured to determine placement of robotic end effector 1206 within inspection environment 1200. A coordinate system for inspection environment 1200 includes x-axis 1290, y-axis 1292, and z-axis 1294. Vertical position sensor 1286 determines placement of robotic end effector 1206 with coordinates in z-axis 1294. Horizontal position sensor 1288 determines placement of robotic end effector 1206 with coordinates in x-axis 1290 and y-axis 1292.

To perform an ultrasonic inspection of inconsistency 1274, dual function non-destructive inspection apparatus 1254 is positioned within inspection environment 1200 relative to structure 1204 such that Ultrasonic inspection system 1238 is in contact with inspection surface 1216. To perform an ultrasonic inspection of a portion of inspection surface 1216, Ultrasonic inspection system 1238 is moved relative to inspection surface 1216 using movement system 1242. Flange-mounted roller 1210 is maintained against inspection surface 1216 by extendable actuator 1208.

In some illustrative examples, controller 1278 is configured to determine the subsequent vertical positions and subsequent horizontal positions using the equations:

$$d_y = \text{dist}*\cos(\text{Ang}) - \text{dist}_{init}*\cos(\text{Ang\_init}) - dS*\sin(\text{Ang}_{init})$$

$$d_z = \text{dist}*\sin(\text{Ang}) - \text{dist}_{init}*\sin(\text{Ang}_{init}) + dS*\cos(\text{Ang}_{init})$$

$$Y_{pos} = Y_{pos\_init} + d_y$$

$$Z_{pos} = Z_{pos\_set} + d_z$$

wherein dist is an offset distance determined from distance measurements of number of distance sensors 1282, dist_init is a desired offset distance, Ang is a measurement from rotational angle sensor 1284, Ang_init is an initial end effector pitch angle, $Y_{pos\_init}$ is an initial horizontal position, $Z_{pos\_set}$ is an adjustable set point for vertical position, $Y_{pos}$ is a subsequent horizontal position from horizontal position sensor 1288, $Z_{pos}$ is a subsequent vertical position from vertical position sensor 1286, and dS is the specified move distance from the current position along the surface.

To perform an ultrasonic inspection of inconsistency 1274, dual function non-destructive inspection apparatus 1254 is positioned within inspection environment 1200 relative to structure 1204 such that flange-mounted roller 1210 of ultrasonic inspection system 1238 can be extended and placed into contact with inspection surface 1216. Ultrasonic sensor 1212 within flange-mounted roller 1210 takes the form of an ultrasonic linear array. Ultrasonic sensor 1212 covers a swath of an area when flange-mounted roller 1210 is rolled along inspection surface 1216.

To perform an ultrasonic inspection of a portion of inspection surface 1216, ultrasonic inspection system 1238 is moved relative to inspection surface 1216 using movement system 1242. Thus, ultrasonic inspection system 1238 scans "swaths" of inspection surface 1216. Flange-mounted roller 1210 is maintained against inspection surface 1216 by extendable actuator 1208.

The illustration of ultrasonic inspection system 100 in FIGS. 1-8, robotic end effector 200 in FIGS. 2-8, and non-destructive inspection system 1202 in FIG. 12 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although robotic end effector 1206 is depicted with dual function non-destructive inspection apparatus 1254, in some other illustrative examples, only ultrasonic inspection system 1238 is present. As another example, although robotic end effector 1206 is depicted with dual function non-destructive inspection apparatus 1254, in some other illustrative examples, robotic end effector 1206 with motion control system 1280 may be configured to perform operations other than inspections. For instance, within examples, robotic end effector 1206 with motion control system 1280 is configured to apply a coating, clean structure 1204, perform a repair, perform drilling or routing, or perform any other desirable function.

As yet another example, although robotic end effector 1206 is depicted as having flange-mounted roller 1210, flange-mounted roller 1210 may be optional. In some illustrative examples, ultrasonic inspection system 1238 has a linear array probe without flange-mounted roller 1210. In these illustrative examples, an ultrasonic inspection is performed with the linear array probe in robotic end effector 1206.

The different components shown in FIGS. 1-11 may be combined with components in FIG. 12, used with components in FIG. 12, or a combination of the two. Additionally, some of the components in FIGS. 1-9 may be illustrative examples of how components shown in block form in FIG. 12 may be implemented as physical structures. For instance, with examples, (i) inspection environment 301 is an implementation of inspection environment 1200, (ii) non-destructive inspection system 316 of FIGS. 3-8 is an implementation of non-destructive inspection system 1202, (iii) structure 302 is an implementation of structure 1204, (iv) robotic end effector 200 is an implementation of robotic end effector 1206, (v) surface contact assembly 112 is an implementation of surface contact assembly 1222, (vi) ultrasonic inspection system 100 is an implementation of ultrasonic inspection system 1238, (vii) movement system 702 is an implementation of movement system 1242, and/or (viii) dual function non-destructive inspection apparatus 202 is an implementation of dual function non-destructive inspection apparatus 1254.

Figure 13:
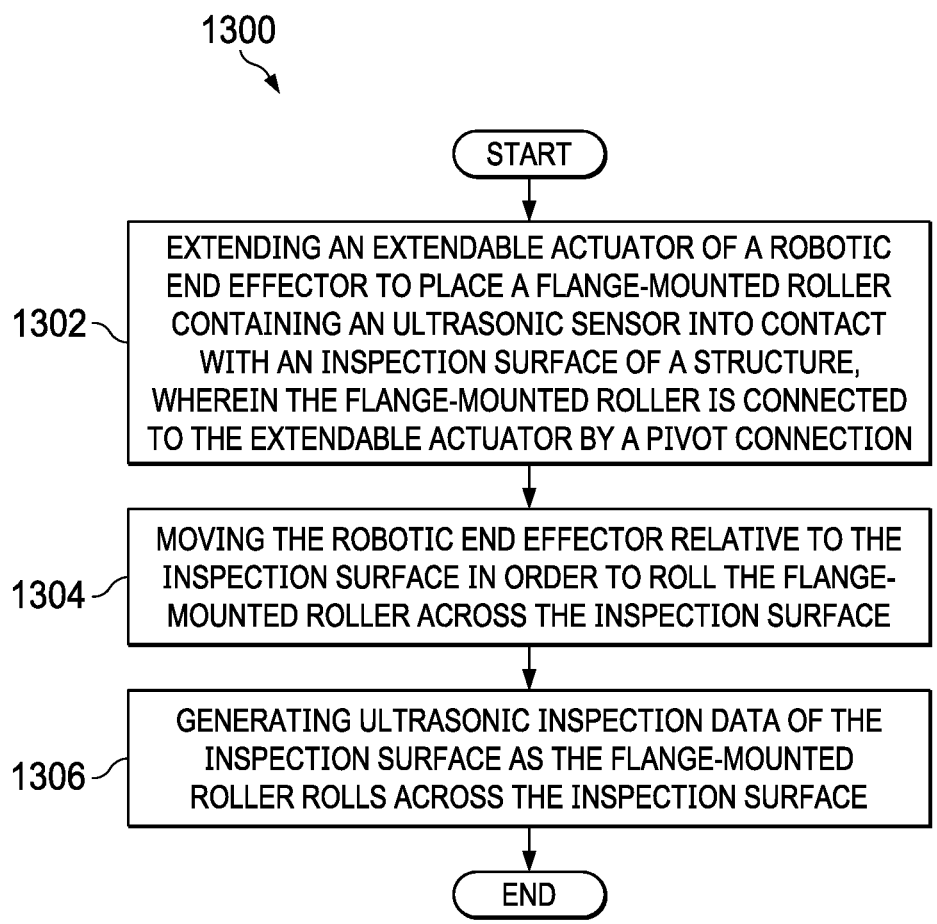
FIG. 13 is an illustration of a flowchart of a method of performing an ultrasonic inspection in accordance with an illustrative example.

Turning now to FIG. 13, an illustration of a flowchart of a method of performing an ultrasonic inspection is depicted in accordance with an illustrative example. In some illustrative examples, method 1300 uses ultrasonic inspection system 100 of FIGS. 1-8. In some illustrative examples, method 1300 uses robotic end effector 200 of FIGS. 2-8. In some illustrative examples, method 1300 using robotic end effector 1206 of FIG. 12.

Method 1300 extends an extendable actuator of a robotic end effector to place a flange-mounted roller containing an ultrasonic sensor into contact with an inspection surface of a structure, wherein the flange-mounted roller is connected to the extendable actuator by a pivot connection (operation 1302). Method 1300 moves the robotic end effector relative to the inspection surface in order to roll the flange-mounted roller across the inspection surface (operation 1304). Method 1300 generates ultrasonic inspection data of the inspection surface as the flange-mounted roller rolls across the inspection surface (operation 1306). Afterwards, method 1300 terminates.

Figure 14:
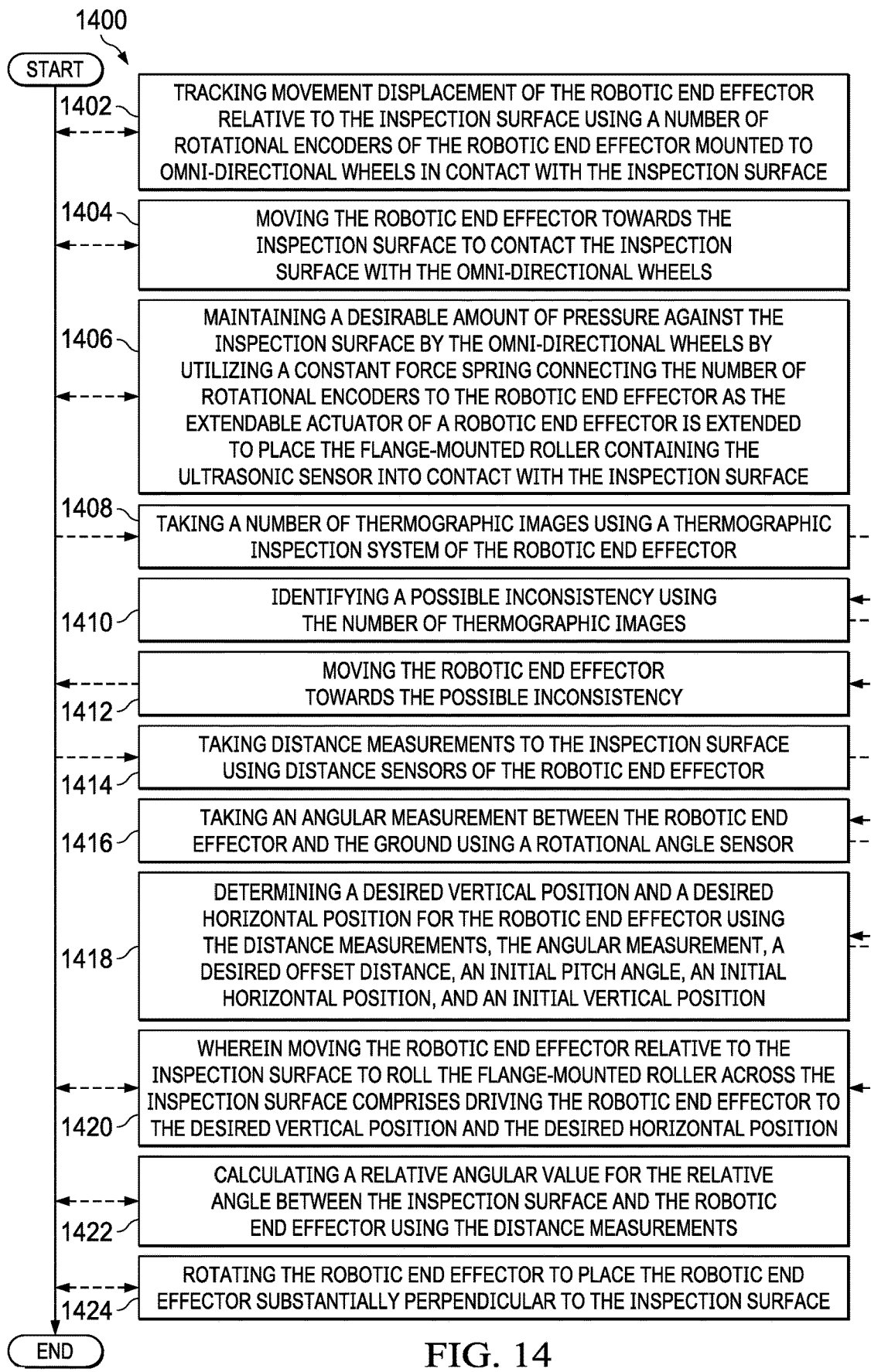
FIG. 14 is an illustration of a flowchart of optional operations for a method of performing an ultrasonic inspection in accordance with an illustrative example.

Turning now to FIG. 14, an illustration of a flowchart of optional operations for a method of performing an ultrasonic inspection is depicted in accordance with an illustrative example. Flowchart 1400 depicts optional operations for method 1300 of FIG. 13.

In some illustrative examples, method 1300 further tracks movement displacement of the robotic end effector relative to the inspection surface using a number of rotational encoders of the robotic end effector mounted to omni-directional wheels in contact with the inspection surface (operation 1402). In some illustrative examples, movement displacement data from the number of rotational encoders of the robotic end effector is associated with the ultrasonic inspection data generated as the flange-mounted roller rolls across the inspection surface. In some illustrative examples, movement displacement data is used to determine a position of the robotic end effector on the inspection surface.

In some illustrative examples, method 1300 moves the robotic end effector towards the inspection surface to contact the inspection surface with the omni-directional wheels (operation 1404). When robotic end effector is moved towards the inspection surface, a movement system connected to the robotic end effector moves the robotic end effector. The movement system takes any desirable form, such as a gantry, a robotic arm, a holonomic movement base, or any other desirable form a movement system.

In some illustrative examples, method 1300 maintains a desirable amount of pressure against the inspection surface by the omni-directional wheels by utilizing a constant force spring connecting the number of rotational encoders to the robotic end effector as the extendable actuator of a robotic end effector is extended to place the flange-mounted roller containing the ultrasonic sensor into contact with the inspection surface (operation 1406). In some illustrative examples, as the extendable actuator of the robotic end effector is extended, a base of the surface contact assembly moves towards the inspection surface. As the base moves towards the inspection surface, the base moves towards the omni-directional wheels. In some illustrative examples, the omni-directional wheels are connected to a linear guide in order to translate across the base as it moves towards the inspection surface.

In some illustrative examples, method 1300 is performed using a dual inspection system. In some of these illustrative examples, method 1300 takes a number of thermographic images using a thermographic inspection system of the robotic end effector (operation 1408), identifies a possible inconsistency using the number of thermographic images (operation 1410), and moves the robotic end effector towards the possible inconsistency (operation 1412). After moving the robotic end effector towards the possible inconsistency, the flange-mounted roller is placed into contact with the structure to perform ultrasonic inspection of the possible inconsistency.

In some illustrative examples, method 1300 takes distance measurements to the inspection surface using distance sensors of the robotic end effector (operation 1414), takes an angular measurement between the robotic end effector and the inspection surface using a rotational angle sensor (operation 1416), determines a desired vertical position and a desired horizontal position for the robotic end effector using the distance measurements, the angular measurement between the robotic end effector and the inspection surface, a desired offset distance, an initial end effector pitch angle, an initial horizontal position, and an initial vertical position (operation 1418), and drives the robotic end effector to the desired vertical position and the desired horizontal position. In these illustrative examples, moving the robotic end effector relative to the inspection surface in order to roll the flange-mounted roller across the inspection surface comprises driving the robotic end effector to the desired vertical position and the desired horizontal position (operation 1420).

In some illustrative examples, method 1300 calculates a relative angular value for the relative angle between the inspection surface and the robotic end effector using the distance measurements (operation 1422). In some illustrative examples, method 1300 rotates the robotic end effector to place the robotic end effector substantially perpendicular to the inspection surface (operation 1424).

The distance measurements to the inspection surface are taken using any desirable type and any desirable quantity of distance sensors. The distance measurements may also be referred to as end effector offset distance measurements. The desired horizontal position and the desired vertical position are positions within a coordinate system of a manufacturing environment. In some illustrative examples, the desired horizontal position and the desired vertical position are determined to maintain a desired offset distance from the surface without prior knowledge of the surface shape. Operations 1414 through 1420 allow for a robotic end effector to follow the surface of the structure without prior knowledge of the surface shape. For example, a robotic end effector may follow the surface of the structure using operations 1414 and 1420 without a CAD model or separate surface scan prior to following the surface.

The desired vertical position and the desired horizontal position may be determined using a kinematics-based method. In some illustrative examples, determining a desired vertical position and a desired horizontal position for the robotic end effector is performed using the equations:

$$d_y = \text{dist}^* \cos(\text{Ang}) - \text{dist}_{init}^* \cos(\text{Ang}_{init}) - dS^* \sin(\text{Ang}_{init})$$

$$d_z = \text{dist}^* \sin(\text{Ang}) - \text{dist}_{init}^* \sin(\text{Ang\_init}) + dS^* \cos(\text{Ang}_{init})$$

$$Y_{pos} = Y_{pos\_init} + d_y$$

$$Z_{pos} = Z_{pos\_set} + d_z$$

wherein dist is an offset distance determined from the distance measurements, dist_init is a desired offset distance, Ang is the angular measurement between the robotic end effector and the inspection surface, Ang_init is the initial end effector pitch angle, $Y_{pos\_init}$ is the initial horizontal position, $Z_{pos\_set}$ is the initial vertical position, $Y_{pos}$ is the desired horizontal position, $Z_{pos}$ is the desired vertical position, and dS is the specified move distance from the current position along the surface. dist may be calculated in any desirable fashion. In some illustrative examples, offset distance dist is determined by averaging the distance measurements. dS may be calculated based on the user specified velocity for the probe to move across the surface and the update cycle time of the system control loop.

The order of the functions noted in the blocks is not meant to imply limitations to the manner in which an illustrative embodiment may be implemented. In some alternative implementations of an illustrative embodiment, the function or functions noted in the blocks may occur out of the order noted in the figure. For example, in some cases, two blocks shown in succession may be executed substantially concurrently, or the blocks may sometimes be performed in the reverse order, depending upon the functionality involved.

Figure 15:
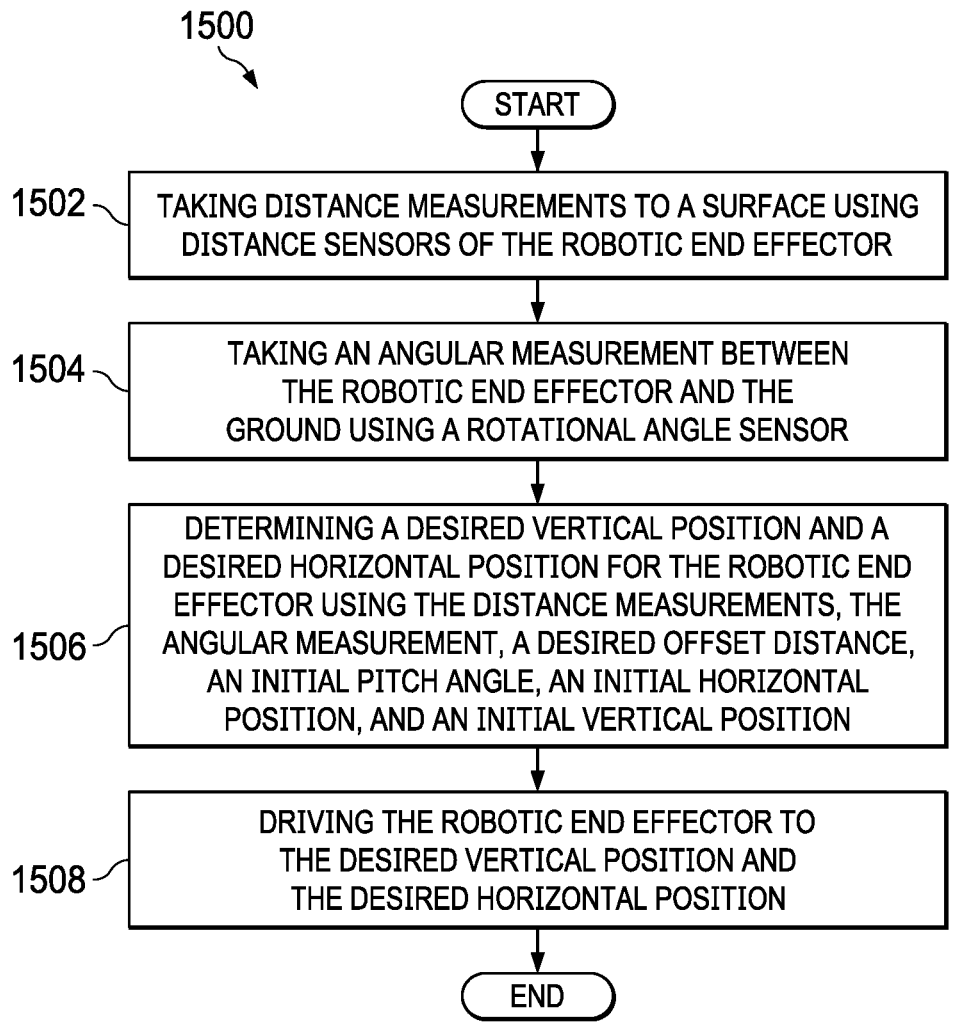
FIG. 15 is an illustration of a flowchart of a method of following an inspection surface of a structure with a robotic end effector in accordance with an illustrative example.

Turning now to FIG. 15, an illustration of a flowchart of a method of following a surface of a structure with a robotic end effector is depicted in accordance with an illustrative example. Within examples, method 1500 is performed using robotic end effector 200 of FIGS. 2-8. Within examples, method 1500 is performed using robotic end effector 902 of FIG. 9. Within examples, method 1500 is performed using robotic end effector 1206 of FIG. 12.

Method 1500 takes distance measurements to the surface using distance sensors of the robotic end effector (operation 1502). The distance sensors take any desirable form. In some illustrative examples, the distance sensors are laser sensors. Method 1500 takes an angular measurement of the robotic end effector using a rotational angle sensor (operation 1504). Method 1500 determines a desired vertical position and a desired horizontal position for the robotic end effector using the distance measurements, the angular measurement, a desired offset distance, an initial pitch angle, an initial horizontal position, and an initial vertical position (operation 1506). The desired vertical position and the desired horizontal position maintain the robotic end effector the desired offset distance from the surface. Method 1500 drives the robotic end effector to the desired vertical position and the desired horizontal position (operation 1508). By driving the robotic end effector to the desired vertical position and the desired horizontal position, the robotic end effector follows the surface. By utilizing method 1500, the robotic end effector can follow the surface without having prior knowledge of the surface shape. Afterwards, method 1500 terminates.

Figure 16:
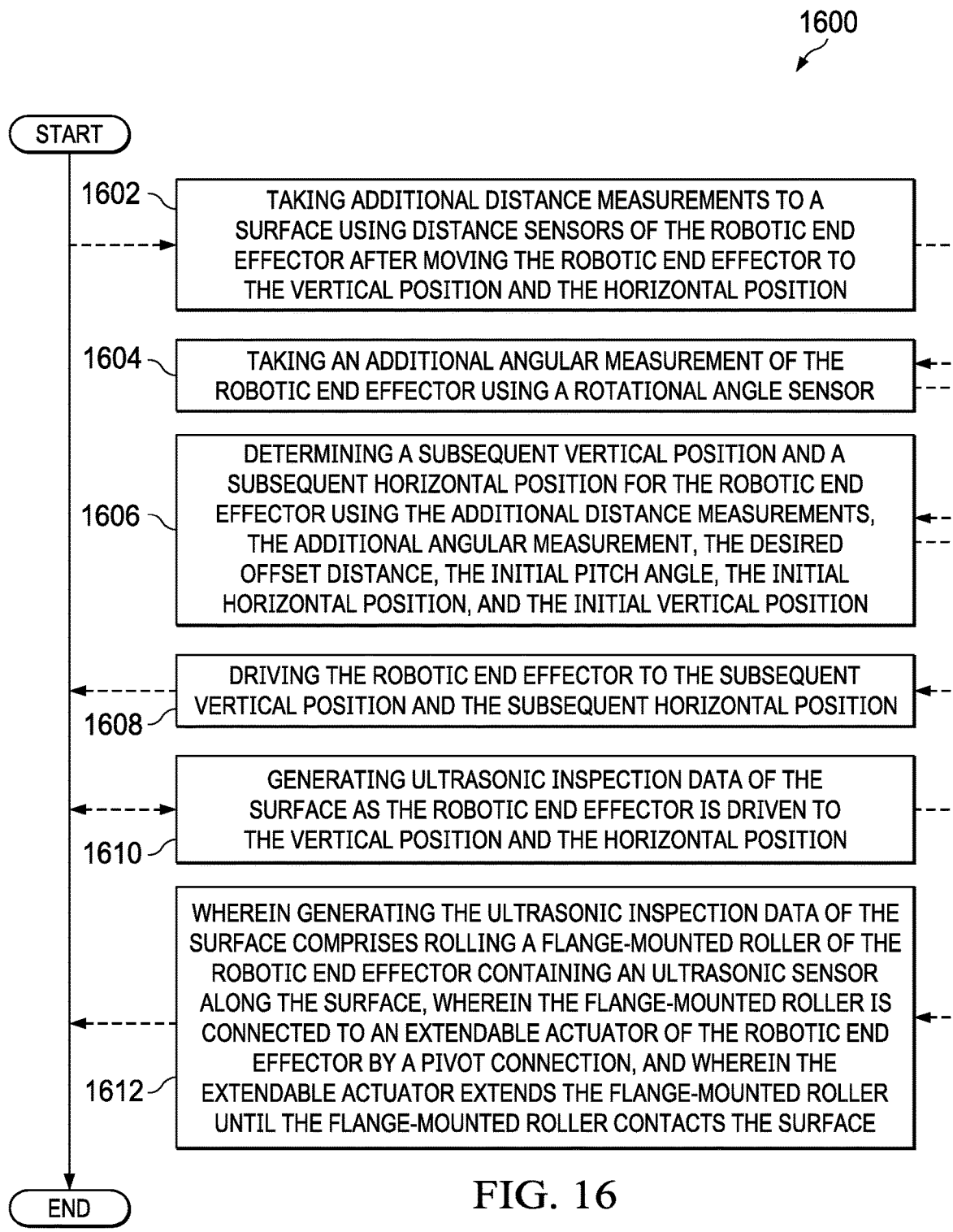
FIG. 16 is an illustration of a flowchart of optional operations for a method of following an inspection surface of a structure with a robotic end effector in accordance with an illustrative example.

Turning now to FIG. 16, an illustration of a flowchart of optional operations for a method of following an inspection surface of a structure with a robotic end effector is depicted in accordance with an illustrative example. Flowchart 1600 depicts optional operations for method 1500 of FIG. 15.

In some illustrative examples, the robotic end effector continues to follow the surface of the structure. Method 1500 takes additional distance measurements to the surface using distance sensors of the robotic end effector after moving the robotic end effector to the desired vertical position and the desired horizontal position (operation 1602). Method 1500 takes an additional angular measurement of the robotic end effector using a rotational angle sensor (operation 1604). Method 1500 determines a subsequent vertical position and a subsequent horizontal position for the robotic end effector using the additional distance measurements, the additional angular measurement, the desired offset distance, the initial pitch angle, the initial horizontal position, and the initial vertical position (operation 1606). Afterwards, method 1500 drives the robotic end effector to the subsequent vertical position and the subsequent horizontal position (operation 1608).

Figure 17:
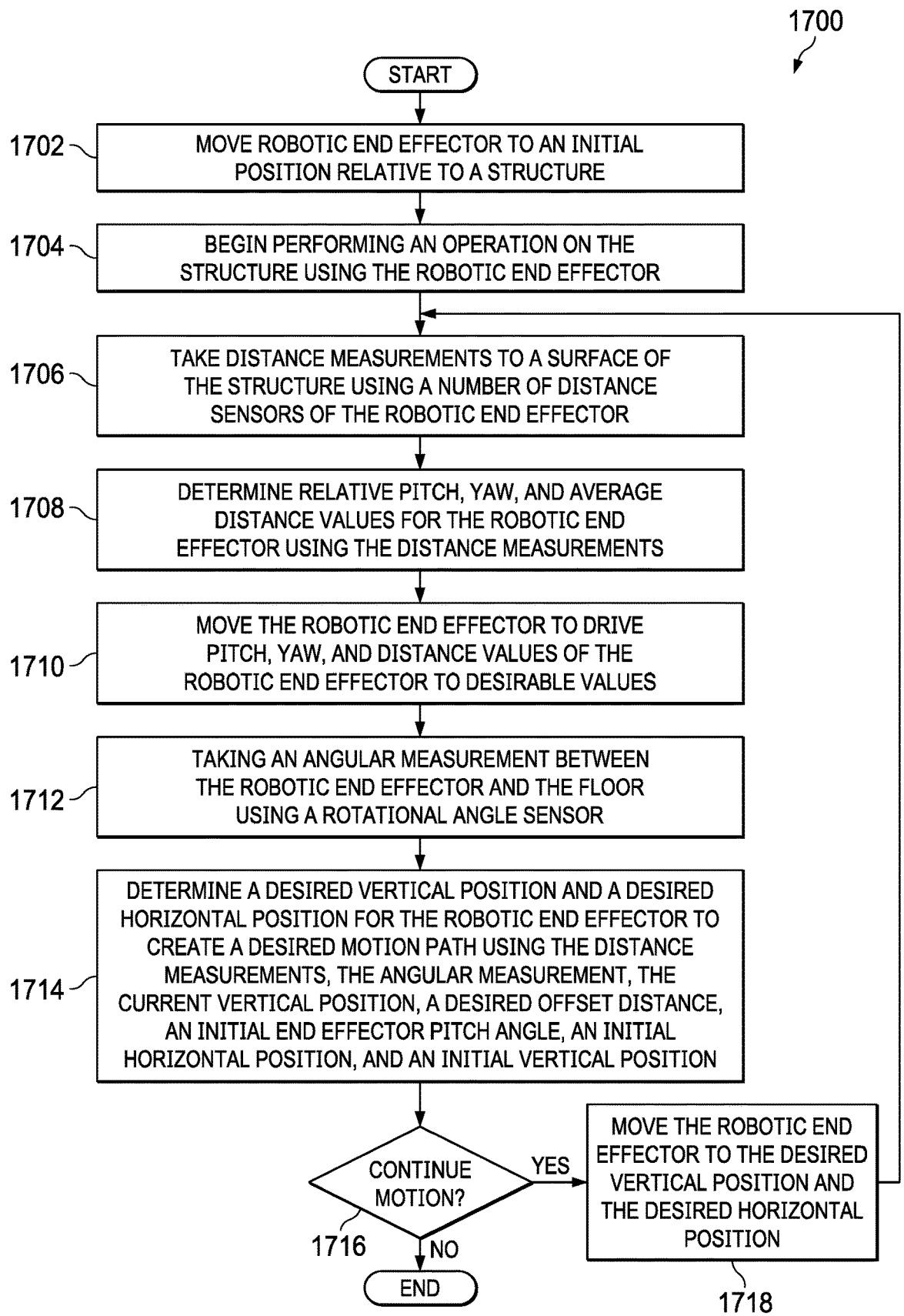
FIG. 17 is an illustration of a flowchart of a method of following an inspection surface of a structure with a robotic end effector in accordance with an illustrative example.

In some illustrative examples, the robotic end effector is a component of a non-destructive inspection system and method 1500 further comprises generating ultrasonic inspection data of the surface as the robotic end effector is driven to the desired vertical position and the desired horizontal position (operation 1610). In some illustrative examples, generating the ultrasonic inspection data of the surface comprises rolling a flange-mounted roller of the robotic end effector containing an ultrasonic sensor along the surface, wherein the flange-mounted roller is connected to an extendable actuator of the robotic end effector by a pivot connection, and wherein the extendable actuator extends the flange-mounted roller until the flange-mounted roller contacts the surface (operation 1612). Turning now to FIG. 17, an illustration of a flowchart of a method of following an inspection surface of a structure with a robotic end effector is depicted in accordance with an illustrative example. Within examples, method 1700 is performed using robotic end effector 200 of FIGS. 2-8. Within examples, method 1700 is performed using robotic end effector 902 of FIG. 9. Within examples, method 1700 is performed using robotic end effector 1206 of FIG. 12.

Method 1700 moves robotic end effector to an initial position relative to a structure (operation 1702). Method 1700 begins performing an operation on the structure using the robotic end effector (operation 1704). The operation takes any desirable form, such as painting, coating, brushing, cleaning, inspecting, sanding, or any other desirable operation. When the robotic end effector includes a non-destructive inspection sensor, such as ultrasonic sensor 1212 of FIG. 12, the operation may take the form of a non-destructive inspection.

Method 1700 takes distance measurements to a surface of the structure using a number of distance sensors of the robotic end effector (operation 1706). The distance measurements may be taken using number of distance sensors 1082 of FIG. 10. Method 1700 determines relative pitch, yaw, and average distance values for the robotic end effector using the distance measurements (operation 1708).

Method 1700 moves the robotic end effector to drive pitch, yaw, and distance values of the robotic end effector to desirable values (operation 1710). In some illustrative examples, the pitch and yaw values are approximately 0. The desirable value for the distance value is a set distance. In some illustrative examples, this set distance is selected to maintain contact between a portion of the robotic end effector and the surface of the structure. Method 1700 takes an angular measurement between the robotic end effector and the floor using a rotational angle sensor (operation 1712).

Method 1700 determines a desired vertical position and a desired horizontal position for the robotic end effector to create a desired motion path using the distance measurements, the angular measurement, the current vertical position, a desired offset distance, an initial end effector pitch angle, an initial horizontal position, and an initial vertical position (operation 1714). After determining the desired vertical position and the desired horizontal position, method 1700 determines if the robotic end effector should continue motion (operation 1716). If the determination of operation 1716 is no, method 1700 ends. If the determination of operation 1716 is yes, method 1700 moves the robotic end effector to the desired vertical position and the desired horizontal position (operation 1718). After performing operation 1718, method 1700 repeats operation 1706 through operation 1716.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, "at least one of item A, item B, or item C" may include, without limitation, item A, item A and item B, or item B. This example also may include item A, item B, and item C, or item B and item C. Of course, any combination of these items may be present. In other examples, "at least one of" may be, for example, without limitation, two of item A, one of item B, and ten of item C; four of item B and seven of item C; or other suitable combinations.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram. Some blocks may be optional. For example, operations 1402 through 1420 of FIG. 14 may be optional. As another example, operations 1602 through 1612 of FIG. 16 may be optional.

Figure 18:
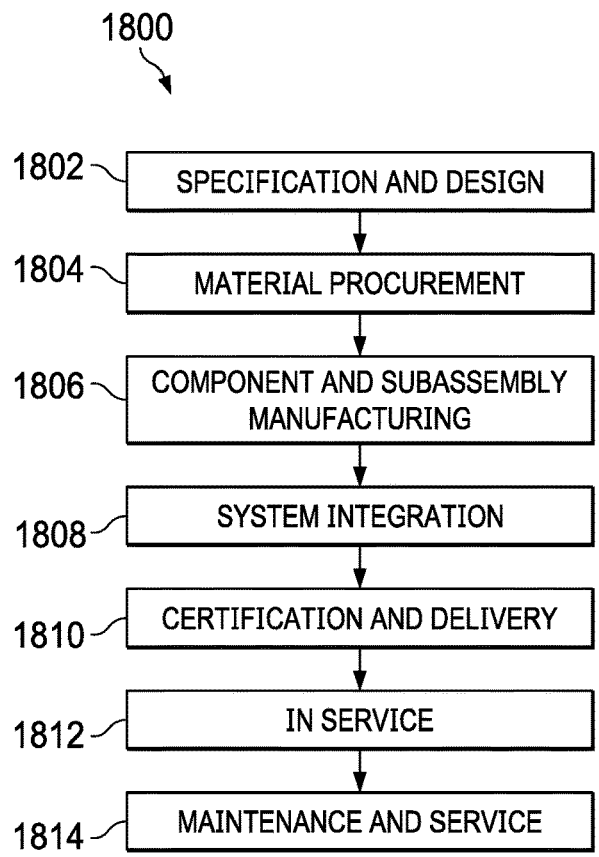
FIG. 18 is an illustration of an aircraft manufacturing and service method in the form of a block diagram in accordance with an illustrative example.
Figure 19:
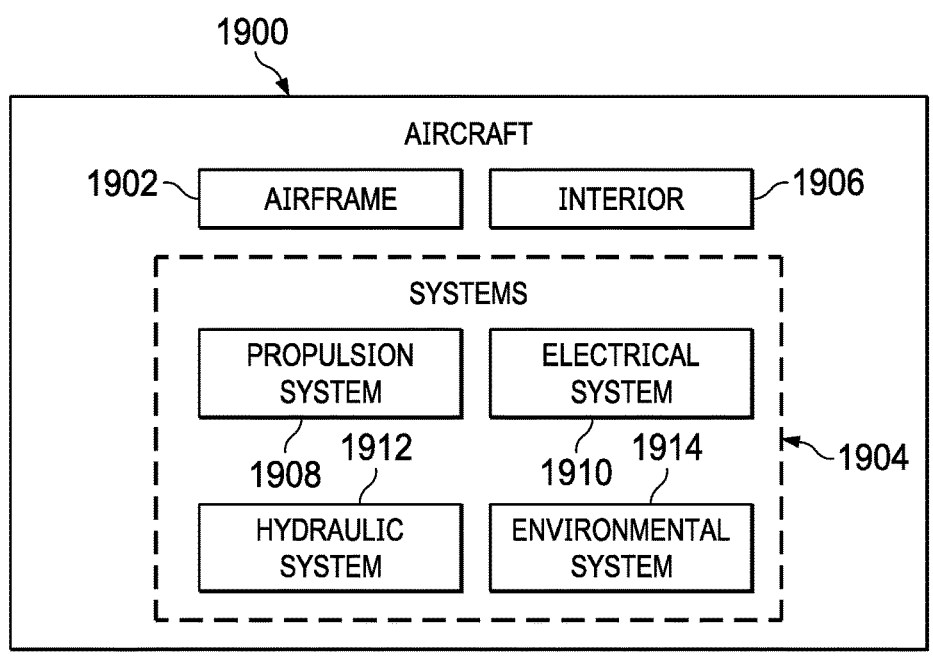
FIG. 19 is an illustration of an aircraft in the form of a block diagram in which an illustrative example may be implemented.

Illustrative embodiments of the present disclosure may be described in the context of aircraft manufacturing and service method 1800 as shown in FIG. 18 and aircraft 1900 as shown in FIG. 19. Turning first to FIG. 18, an illustration of an aircraft manufacturing and service method is depicted in accordance with an illustrative embodiment. During pre-production, aircraft manufacturing and service method 1800 may include specification and design 1802 of aircraft 1900 in FIG. 19 and material procurement 1804.

During production, component and subassembly manufacturing 1806 and system integration 1808 of aircraft 1900 takes place. Thereafter, aircraft 1900 may go through certification and delivery 1810 in order to be placed in service 1812. While in service 1812 by a customer, aircraft 1900 is scheduled for routine maintenance and service 1814, which may include modification, reconfiguration, refurbishment, or other maintenance and service.

Each of the processes of aircraft manufacturing and service method 1800 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 19, an illustration of an aircraft is depicted in which an illustrative embodiment may be implemented. In this example, aircraft 1900 is produced by aircraft manufacturing and service method 1800 of FIG. 18 and may include airframe 1902 with plurality of systems 1904 and interior 1906. Examples of systems 1904 include one or more of propulsion system 1908, electrical system 1910, hydraulic system 1912, and environmental system 1914. Any number of other systems may be included.

Although an aerospace example is shown, different illustrative embodiments may be applied to other industries, such as the automotive industry.

Apparatuses and methods embodied herein may be employed during at least one of the stages of aircraft manufacturing and service method 1800. One or more illustrative embodiments may be used during at least one of component and subassembly manufacturing 1806, system integration 1808, or maintenance and service 1814 of FIG. 18. For example, the illustrative examples could be used during component and subassembly manufacturing 1806 to inspect components of aircraft 1900. For example, method 1300 may be used during component and subassembly manufacturing 1806 to inspect components of aircraft 1900. As another example, method 1500 may be used during component and subassembly manufacturing 1806 to perform an operation on a component of aircraft 1900. Method 1300 or method 1500 may be used to manufacture or inspect any desirable portion of aircraft 1900, such as airframe 1902 or interior 1906. In yet another example, method 1300 may be used during maintenance and service 1814 to inspect components of aircraft 1900.

The illustrative examples present a robotic end effector configured to follow a surface of a structure. The robotic end effector utilizes distance sensor measurements, an angular measurement, a desired distance from the surface, and initial positions of the robotic end effector to calculate a next position for the robotic end effector.

In some illustrative examples, the robotic end effector includes an ultrasound sensor in a flange-mounted roller. By following the surface of the structure, the flange-mounted roller maintains contact with the surface of the structure. The robotic end effector may alternatively be configured to perform any desirable operation. The robotic end effector may perform cleaning, coating application, drilling, routing, an alternative form of inspection, or any other desirable operation.

In some illustrative examples, a robotic end effector has an extendable actuator and a flange-mounted roller containing an ultrasonic sensor. The flange-mounted roller is connected to the extendable actuator by a pivot connection. The extendable actuator is configured to extend the flange-mounted roller until the flange-mounted roller contacts an inspection surface. The robotic end effector maintains contact between the flange-mounted roller and the surface. Rolling the flange-mounted roller across the surface while the ultrasonic sensor is active generates ultrasonic data for a swath of the surface. The ultrasonic sensor within the flange-mounted roller sends ultrasonic pulses and receives reflected responses to generate the ultrasonic data as the flange-mounted roller rolls across the surface.

In some illustrative examples, the robotic end effector further comprises a number of rotational encoders mounted on omni-directional wheels configured to contact the inspection surface and track movement displacement of the robotic end effector relative to an inspection surface. By tracking the movement displacement, the ultrasonic data is associated with locations on the surface of the structure.

In some illustrative examples, the robotic end effector has a dual inspection system. The dual inspection system uses two different types of inspection. In some illustrative examples, the robotic end effector has a thermographic inspection system and an ultrasonic inspection system. The thermographic inspection system inspects large areas of a surface of a structure.

In the illustrative examples, to use the roller-probe device, a new process has been developed that uses a custom inverse kinematics method to keep the roller-probe aligned with curved surfaces. A new path planning process was also developed to control the base, pitch, and vertical axes working along with an additional compliant translational axis on the probe device in order to maintain force between the roller-probe and the surface to the scanned object. This custom inverse kinematics method can be used to perform operations other than inspection.

The infrared thermography (IRT) inspection capability enables rapid large area inspection and defect detection, and the ultrasound testing (UT) inspection enables characterization of the defects that are identified with IRT. The combination provides a very rapid method for assessing structure for quality and fitness for service. The roller-probe assembly mounts on the IRT structure to support dual-mode scanning. The roller-probe provides ease of use for larger area characterization.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A non-destructive inspection system comprising:
a robotic end effector having an extendable actuator and a flange-mounted roller containing an ultrasonic sensor, the flange-mounted roller connected to the extendable actuator by a pivot connection, the extendable actuator configured to extend the flange-mounted roller until the flange-mounted roller contacts an inspection surface.

2. The non-destructive inspection system of claim 1, wherein the flange-mounted roller is mounted to flanges of a base of a surface contact assembly, and wherein the surface contact assembly is connected to the extendable actuator by the pivot connection.

3. The non-destructive inspection system of claim 1, wherein the robotic end effector further comprises a number of rotational encoders mounted on omni-directional wheels configured to contact the inspection surface and track movement displacement of the robotic end effector relative to the inspection surface.

4. The non-destructive inspection system of claim 3, wherein the number of rotational encoders comprises a first rotary encoder positioned to rotate about a horizontal axis to measure vertical displacement and a second rotary encoder positioned to rotate about a vertical axis to measure horizontal displacement.

5. The non-destructive inspection system of claim 3, wherein the flange-mounted roller is mounted to flanges of a base of a surface contact assembly, wherein the surface contact assembly is connected to the extendable actuator by a sliding structure and the pivot connection, and wherein the number of rotational encoders is connected to the base by a linear guide and a constant force spring.

6. The non-destructive inspection system of claim 5, wherein the constant force spring is configured to provide a desired force against the inspection surface by the omni-directional wheels as the base moves relative to the inspection surface.

7. The non-destructive inspection system of claim 1 further comprising:
a movement system connected to the robotic end effector, the movement system configured to move the robotic end effector relative to an inspection surface of a structure.

8. The non-destructive inspection system of claim 7, wherein the robotic end effector further comprises a motion control system comprising a number of distance sensors, a rotational angle sensor, and a controller, wherein the controller is configured to receive data from the number of distance sensors and the rotational angle sensor, determine subsequent vertical positions and subsequent horizontal positions to follow the inspection surface, and send commands to the movement system to move the robotic end effector to follow the inspection surface of the structure.

9. The non-destructive inspection system of claim 8, wherein the controller is configured to rotate the robotic end effector based on a relative angle between the robotic end effector and a surface normal to place the robotic end effector substantially perpendicular to the inspection surface, wherein the relative angle is determined based on the data from the number of distance sensors.

10. The non-destructive inspection system of claim 1, wherein the robotic end effector further comprises a thermographic inspection system, wherein the extendable actuator is mounted on an exterior of a housing of the thermographic inspection system.

11. A method of performing an ultrasonic inspection comprising:
extending an extendable actuator of a robotic end effector to place a flange-mounted roller containing an ultrasonic sensor into contact with an inspection surface of a structure, wherein the flange-mounted roller is connected to the extendable actuator by a pivot connection;
moving the robotic end effector relative to the inspection surface in order to roll the flange-mounted roller across the inspection surface; and
generating ultrasonic inspection data of the inspection surface as the flange-mounted roller rolls across the inspection surface.

12. The method of claim 11 further comprising:
tracking movement displacement of the robotic end effector relative to the inspection surface using a number of rotational encoders of the robotic end effector mounted to omni-directional wheels in contact with the inspection surface.

13. The method of claim 12 further comprising:
moving the robotic end effector towards the inspection surface to contact the inspection surface with the omni-directional wheels.

14. The method of claim 13 further comprising:
maintaining a desirable amount of pressure against the inspection surface by the omni-directional wheels by utilizing a constant force spring connecting the number of rotational encoders to the robotic end effector as the extendable actuator of a robotic end effector is extended to place the flange-mounted roller containing the ultrasonic sensor into contact with the inspection surface.

15. The method of claim 11 further comprising:
taking a number of thermographic images using a thermographic inspection system of the robotic end effector;
identifying a possible inconsistency using the number of thermographic images; and
moving the robotic end effector towards the possible inconsistency.

16. The method of claim 11 further comprising:
taking distance measurements to the inspection surface using distance sensors of the robotic end effector;
taking an angular measurement between the robotic end effector and the floor using a rotational angle sensor;
determining a desired vertical position and a desired horizontal position for the robotic end effector using the distance measurements, the angular measurement, a desired offset distance, an initial end effector pitch angle, an initial horizontal position, and an initial vertical position; and
wherein moving the robotic end effector relative to the inspection surface in order to roll the flange-mounted roller across the inspection surface comprises driving the robotic end effector to the desired vertical position and the desired horizontal position.

17. The method of claim 16 further comprising:
calculating a relative angular value for a relative angle between the inspection surface and the robotic end effector using the distance measurements; and
rotating the robotic end effector to place the robotic end effector substantially perpendicular to the inspection surface.

18. A method of following a surface of a structure with a robotic end effector, the method comprising:
taking distance measurements to the surface using distance sensors of the robotic end effector;
taking an angular measurement between the robotic end effector and the floor using a rotational angle sensor;
determining a desired vertical position and a desired horizontal position for the robotic end effector using the distance measurements, the angular measurement, a desired offset distance, an initial pitch angle, an initial horizontal position, and an initial vertical position; and
driving the robotic end effector to the desired vertical position and the desired horizontal position.

19. The method of claim 18 further comprising:
taking additional distance measurements to the surface using distance sensors of the robotic end effector after moving the robotic end effector to the desired vertical position and the desired horizontal position;
taking an additional angular measurement of the robotic end effector using a rotational angle sensor;
determining a subsequent vertical position and a subsequent horizontal position for the robotic end effector using the additional distance measurements, the additional angular measurement, the desired offset distance, the initial pitch angle, the initial horizontal position, and the initial vertical position; and
driving the robotic end effector to the subsequent vertical position and the subsequent horizontal position.

20. The method of claim 18, wherein the robotic end effector comprises a non-destructive inspection system, the method further comprising:
generating ultrasonic inspection data of the surface as the robotic end effector is driven to the desired vertical position and the desired horizontal position.

21. The method of claim 20, wherein generating the ultrasonic inspection data of the surface comprises rolling a flange-mounted roller of the robotic end effector containing an ultrasonic sensor along the surface, wherein the flange-mounted roller is connected to an extendable actuator of the robotic end effector by a pivot connection, and wherein the extendable actuator extends the flange-mounted roller until the flange-mounted roller contacts the surface.

\* \* \* \* \*